United States Patent
Hu et al.

(10) Patent No.: US 12,443,839 B2
(45) Date of Patent: Oct. 14, 2025

(54) HYPERPARAMETER TRANSFER VIA THE THEORY OF INFINITE-WIDTH NEURAL NETWORKS

(71) Applicant: Microsoft Technology Licensing, LLC, Redmond, WA (US)

(72) Inventors: Jingfeng Hu, Redmond, WA (US); Ge Yang, Redmond, WA (US); Xiaodong Liu, Redmond, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 631 days.

(21) Appl. No.: 17/000,065

(22) Filed: Aug. 21, 2020

(65) Prior Publication Data
US 2022/0058477 A1    Feb. 24, 2022

(51) Int. Cl.
*G06N 3/08*     (2023.01)
*G06N 3/045*    (2023.01)

(52) U.S. Cl.
CPC ............... *G06N 3/08* (2013.01); *G06N 3/045* (2023.01)

(58) Field of Classification Search
CPC .......... G06N 3/08; G06N 3/045; G06N 3/044; G06N 3/084
See application file for complete search history.

(56) References Cited

U.S. PATENT DOCUMENTS

| | | | |
|---|---|---|---|
| 2019/0129764 A1 | 5/2019 | Johnson et al. | |
| 2019/0392815 A1* | 12/2019 | Raghavendra | G10L 13/04 |
| 2020/0057944 A1* | 2/2020 | Loh | G06N 5/01 |
| 2020/0125961 A1 | 4/2020 | Agrawal et al. | |
| 2020/0302295 A1* | 9/2020 | Tung | G06N 3/045 |
| 2021/0142177 A1* | 5/2021 | Mallya | G06N 3/084 |
| 2021/0241165 A1* | 8/2021 | Branchaud-Charron | G06N 20/00 |
| 2021/0279576 A1* | 9/2021 | Shazeer | G06N 3/08 |
| 2021/0312628 A1* | 10/2021 | Larlus-Larrondo | G06T 7/73 |

OTHER PUBLICATIONS

Micaelli, P. et al., "Zero-shot Knowledge Transfer via Adversarial Belief Matching", https://arxiv.org/abs/1905.09768 (Year: 2019).*

(Continued)

*Primary Examiner* — Alexey Shmatov
*Assistant Examiner* — Devika S Maharaj

(57) ABSTRACT

Systems and method are provided that are directed to tuning a hyperparameter associated with a small neural network model and transferring the hyperparameter to a large neural network model. At least one neural network model may be received along with a request for one or more tuned hyperparameters. Prior to scaling the large neural network, the large neural network is parameterized in accordance with a parameterizing scheme. The large neural network is then scaled and reduced in size such that a hyperparameter tuning process may be performed. A tuned hyperparameter may then be provided to a requestor such that the hyperparameter can be directly input into the large neural network. By tuning a hyper parameter using a small neural network, significant computation cycles and energy may be saved.

20 Claims, 13 Drawing Sheets

(56) References Cited

OTHER PUBLICATIONS

Hron, J. et al., "Infinite attention: NNGP and NTK for deep attention networks", https://arxiv.org/abs/2006.10540 (Year: 2020).*
Jacot, A. et al., "Neural Tangent Kernel: Convergence and Generalization in Neural Networks", https://arxiv.org/abs/1806.07572, Feb. 10, 2020 (Year: 2020).*
Lee, J. et al., "Wide Neural Networks of Any Depth Evolve as Linear Models Under Gradient Descent", https://arxiv.org/abs/1902.06720 (Year: 2019).*
Ashok, A. et al., "N2N Learning: Network to Network Compression via Policy Gradient Reinforcement Learning", https://arxiv.org/abs/1709.06030 (Year: 2017).*
Lee, J. et al., "Finite Versus Infinite Neural Networks: an Empirical Study", https://arxiv.org/abs/2007.15801v1, Jul. 31, 2020 (Year: 2020).*
Du, Y. et al., "Deep scaled dot-product attention based domain adaptation model for biomedical question answering", https://www.sciencedirect.com/science/article/pii/S1046202319300295?via%3Dihub (Year: 2019).*
"International Search Report and Written Opinion Issued in PCT Application No. PCT/US21/032137", Mailed Date: Aug. 6, 2021, 13 Pages.
First Examination Report Received for India Application No. 202317008865, mailed on Aug. 22, 2025, 08 pages.

* cited by examiner

HYPERPARAMETER TRANSFER VIA THE THEORY OF INFINITE-WIDTH NEURAL NETWORKS

BACKGROUND

Machine learning and artificial intelligence techniques can be useful for solving a number of complex computational problems such as recognizing images and speech, analyzing and classifying information, and performing various classification tasks. Machine learning is a field of computer science that uses statistical techniques to give computer systems the ability to extract higher-level features from a set of training data. Specifically, the features can be extracted by training a model such as an artificial neural network or a deep neural network. After the model is trained, new data can be applied to the model and the new data can be classified (e.g., higher-level features can be extracted) using the trained model. Machine learning models are typically executed on a general-purpose processor (also referred to as a central processing unit (CPU)). However, training the models and/or using the models can be computationally expensive and utilize so much energy that multiple tuning and training passes are often impractical for very large models. Accordingly, there is ample opportunity for improvements in computer hardware and software to implement neural networks. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Deep learning hyperparameter tuning is an empirical science that requires significant computational resources, especially for state-of-the-art models with billions of trained parameters. Leveraging the theory of infinitely wide neural networks, a more efficient hyperparameter tuning approach is presented. Specifically, hyperparameters are tuned indirectly on a narrower model, which is more efficient in computation and energy use than tuning hyperparameters on a large model. The tuned hyperparameters may then be transferred to the full-size model according to the scaling requirements. The approaches presented herein are broadly applicable to all standard neural networks and, in principle, all non-architectural and non-regularizing hyperparameters.

In accordance with at least one example of the present disclosure, a method for tuning a hyperparameter of a large neural network is provided. The method may include receiving a large neural network model, parameterizing the large neural network model according to a parameterization scheme, and reducing a width of at least one layer of the large neural network resulting in a smaller neural network. The method may further include performing a hyperparameter tuning process using the smaller neural network to identify a tuned hyperparameter, and transferring the tuned hyperparameter to the large neural network model.

In accordance with at least one example of the present disclosure, a method for providing hyperparameters is provided. The method may include receiving a neural network model, receiving, from a first requestor, a request for one or more tuned hyperparameters associated with the neural network model, and parameterizing the received neural network model. The method may further include scaling the received neural network model to a smaller size neural network model, tuning one or more hyperparameters associated with the smaller size neural network model, and providing the one or more tuned hyperparameters to the requestor.

In accordance with at least one example of the present disclosure, a data center server configured to provide one or more tuned hyperparameters based on a received input is provided. The data center server may include a processor and memory. The memory may include instructions, which when executed by the processor, causes the processor to receive a neural network model, receive, from a first requestor, a request for a set of non-structural hyperparameters comprising at least one hyperparameter associated with the neural network model, scale the received neural network model to a smaller size neural network model, tune one or more hyperparameters associated with the smaller size neural network model, and provide the one or more tuned hyperparameters to the requestor as the set of non-structural hyperparameters, wherein the one or more tuned hyperparameters may be used to train the received neural network model.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
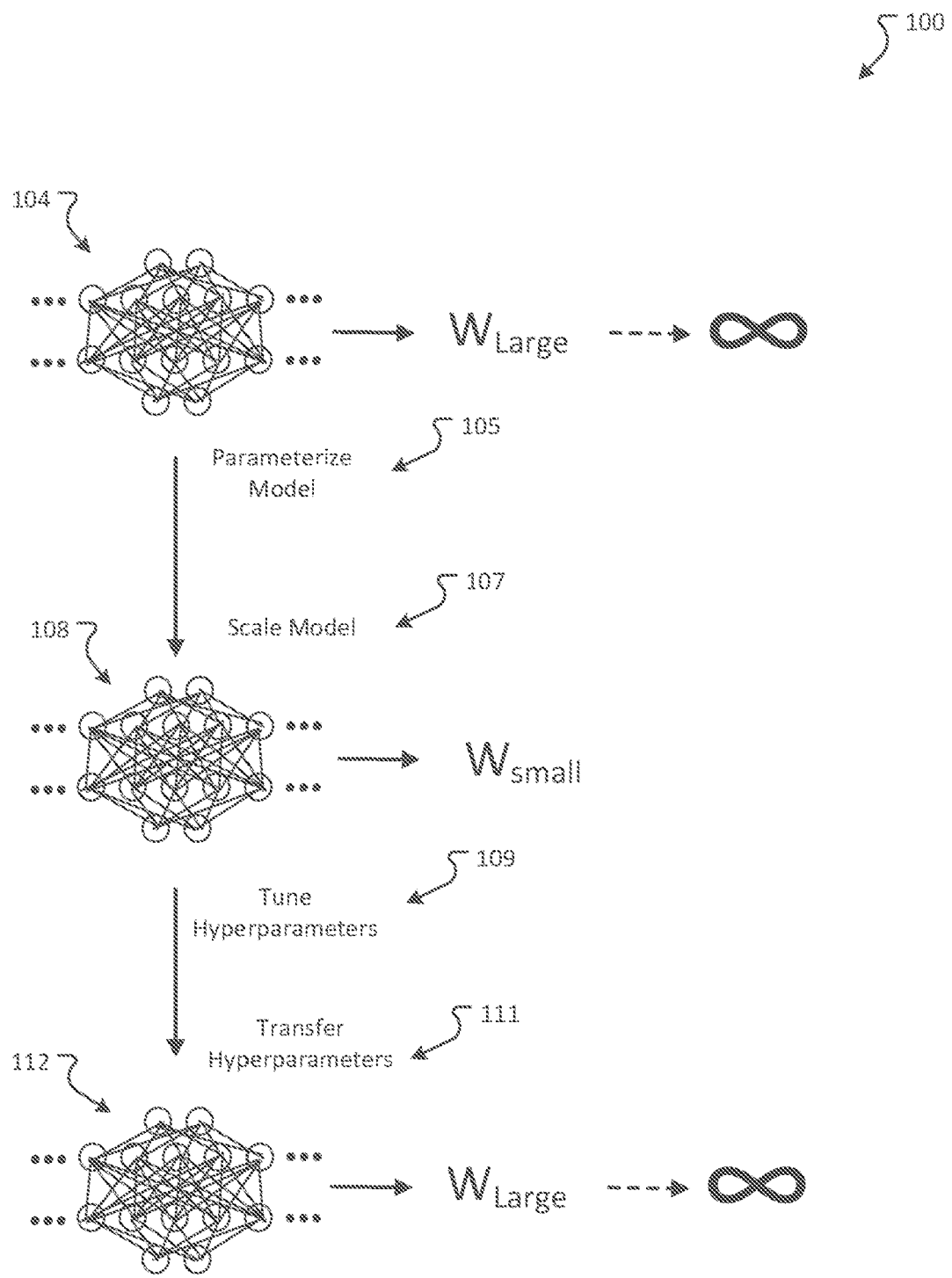
FIG. 1 depicts an overview of an application of hyperparameter transfer based on the theory of infinite-width neural networks in accordance with examples of the present disclosure.

In the following detailed description, references are made to the accompanying drawings that form a part hereof, and in which are shown by way of illustrations specific examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The process of training deep learning models exhibits qualitative improvements when trained at scale. That is, neural networks with hundreds of billion parameters may be successfully trained while showing potential improvement with even larger models. However, to train a model with hundreds of billion parameters requires an extensive amount of resources; thus, it is often cost prohibitive, in terms of energy and an amount of required compute for example, to train such models to near convergence multiple times. Tuning a model only once challenges the traditional deep learning paradigm where a grid of hyperparameters may be used to tune a model on a validation set, yet the performance loss due to sub-optimal hyperparameters is more wasteful at scale.

Rather counter-intuitively, extremely wide neural networks, when properly initialized and scaled, follow predicative behaviors in the infinite-width limit. Theoretical results suggest that feature-learning neural networks converge to a deterministic infinite-width limit in despite of random Gaussian initialization. As the landscape of wide neural networks is similar to that of their infinite-width limit, the behavior of hyperparameters suggest that they also stay similar.

In accordance with examples of the present disclosure, one can indirectly tune a large model (up to infinitely-wide) by tuning a much smaller model. Infinite-wide neural networks are often studied as a tool to understand the generalization capability of highly over parameterized networks. However, the failure to model feature-learning has largely confined topics like neural network-Gaussian process (NN-GP) correspondence and neural tangent kernel (NTK) to kernel methods, which do not describe practical neural networks.

A limit that describes feature learning in infinitely-wide neural networks is deterministic in probability over random initialization. Once a neural network is parameterized properly according to this limit, the width of the network can be increased while keeping everything else constant such that the deterministic limit when the width is very large or approaches infinity can be reached. The hyperparameter landscape of neural networks appear to stay similar in the course of such widening. Thus, the hyperparameter landscape of a neural network model may be explored by sweeping a much smaller model.

In one example, in order to transfer hyperparameters tuned from a small neural network to the large neural network, the target neural network may be inspected to ensure that a valid limiting Tensor Program is present—meaning that the target neural network has a well-defined infinite-width limit. In most cases, the following changes may be made to the neural network parameterization to ensure a well-defined infinite-width limit exists.

Following the new theoretical infinite-width limit, the weights of all but the first layer should be initialized like $$N\left(0, \frac{c}{\text{fan\_in}}\right);$$

for the first layer for some constant c, the weights should be initialized to $$N\left(0, \frac{c}{\text{fan\_out}}\right),$$

for some constant c. The output of the first layer should be multiplied by $O(\sqrt{\text{fan\_out}})$. fan_in is the input dimension of a given layer, fan_out is the output dimension. In addition, the output logits are to be scaled accordingly. That is, the output logits from the last layer shall be multiplied by a scaling factor $$\alpha_{output} = \frac{c}{\sqrt{\text{width}}},$$

for some constant c. In situations where a Transformer is involved, dot-product attention logit scaling should be used. The dot-product of two correlated vectors, key and query in the case of Transformer, may require a normalizing factor to prevent blow up. Accordingly, the attention logits may be multiplied by a normalizing factor of $a_{attn}$, which scales like $a_{attn} = c/d_{head}$, for some constant c, when using stochastic gradient descent with $O(1)$ learning rate. As one non-limiting example, when using the ADAM optimizer with a learning rate scaled like $$O\left(\frac{1}{\sqrt{\text{width}}}\right),$$

the normalizing factor may be scaled similar to $$\alpha_{attn} = \frac{c}{d_{head} d_{model}},$$

for some constant c. More precisely, if the learning rate scales is $$\frac{c}{\sqrt{d_{model}}},$$

for some constant c, (which can be independent of the dimension of the MLP) and $d_k$ is the dimension of the keys (which can be decoupled from the value dimension), then the normalizing factor may be $a_{attn}=c/(d_k d_{model})$, for some constant c.

Once the neural network is properly parameterized, there are several ways to conduct the hyperparameter transfer depending on how width is defined beyond the traditional notion of hidden_size for multi-layer perceptrons (MLPs) and recurrent neural networks (RNNs). Parameterization may include establishing hyperparameters for tuning a model in a specific way. A strategy for a given target network may be dependent on the neural network architecture where different definitions of width may be combined in various examples. As provided below, the examples suggest that approaches presented herein are broadly applicable and useful for all kinds of practical architectures including ResNet and Transformer, as examples.

Once the width dimension has been identified for transfer, the width of the neural network can be varied, as there is an expectation that the hyperparameter landscape will remain stable given some minimal starting width. To train a convolutional neural network such as ResNet, an example width may be defined as the number of filters in every layer.

When scaling Transformers, the width of Transformers can be provided by their $d_{model}$ and $d_{ffn}$, which are the hidden_size of the embedding and the feedforward layer in the MLP module. In the multi-head self-attention component, the embedding from the previous layer is projected to $d_{head}$ to form the key, query, and value vectors, where $d_{head}=d_{model}/n_{heads}$. Either $d_{head}$ or $n_{heads}$ may be chosen to go to infinity while the other is fixed to obtain a valid infinite-width limit.

Different layers in a network can be taken to the infinite-width limit at different rates. For example, when considering only taking the feedforward width $d_{ffn}$ of a Transformer model to infinity, the $d_{model}$ constant may stay fixed. This also produces a valid infinite-width limit as long as the learning rate is scaled as $$O\left(\frac{1}{\sqrt{\text{fan\_in}}}\right)$$

for the feedforward layers when using adaptive optimizers. When it is difficult to scale learning rates differently for specific layers, a non-adaptive optimizer like SGD or a novel adaptive optimizer INFADAM described below may be used. Accordingly, a sweep on a small model with different layer width ratios than the original model may be conducted, with for example $d_{ffn}=d_{model}$.

When shrinking $d_{head}$ in a typical Transformer, the dimension of keys and queries can become too small too quickly, making the hyperparameter landscape very noisy. The variable width-ratio technique described above is useful for solving this problem, by 1) separating the dimension of the key and queries $d_k=d_q$ from the dimension $d_v$ of the value vectors, and 2) shrinking $d_k=d_q$ less than $d_v$.

As both the width and depth of the network are increased in practice, transferring hyperparameters across depth may also be considered herein, which may provide an orthogonal boost in efficiency. In practice, given a minimal depth, the hyperparameter landscape appears to be stable when fixing width and changing depth, after turning off gradient clipping. In some examples, it is possible to not train to completion while still obtaining meaningful information about the optimal hyperparameters, as the narrow model may converge faster. As one example, a meaningfully prediction to the hyperparameter landscape of BERTBASE can be obtained by training a small model on only 30% of the tokens used to train to the full model.

The framework outlined above is applicable to hyperparameter transfers; however, practical implementations often require more considerations in order to use the hyperparameter transfer framework to the fullest extent. For example, adaptive optimizers like ADAM and RMSProp normalize the gradient to be O(1) in width coordinate-wise. This may cause a problem since the infinite-width limit relies on the update to infinite-by-infinite weights be $O(\sqrt{\text{width}})$ smaller in magnitude coordinate-wise than the weights themselves, and the update to finite-by-infinite (or infinite-by-finite) weights to be O(1) coordinate-wise compared to the weights. With off-the-shelf adaptive optimizers, only one constraint or the other can be satisfied.

Accordingly, it may be preferable to make the update-to-weight ratio O(1) when using pre-layer normalization. However, excessive updates to infinite-by-infinite weights causes a blowup of $O(\sqrt{\text{width}})$ coordinate-wise after every matrix multiplication using matmul for example. An ad-hoc solution to improving numerical stability is to scale down either the input or the output of a given matmul operation by $O(\sqrt{\text{fan\_in}})$ of that layer if the learning rate scales as $$O\left(\frac{1}{\sqrt{\text{width}}}\right),$$

and O(fan_in) if the learning rate scales as O(1), such as in the case where only certain layers are taken to infinity.

When the network is narrow, that is having a small width, its approximation to the infinite-width behavior becomes crude, which is results in large fluctuations at preactivation coordinates. When using a squashing activation functions like softmax or tanh, this causes narrower networks to saturate the activation more than wider ones, which results in a systematic bias in the gradients and therefore the hyperparameter landscape. Therefore, it is recommended to replace all non-essential squashing activation functions with ReLU, whose derivative depends only on the sign of the pre-activation.

In principle, the network can be arbitrarily narrowed when conducting the hyperparameter sweep. In practice, when the smallest weight matrix in the network is too small, the output after that layer can exhibit large fluctuations, which is often termed the finite-width effect. This effect can sometimes make the hyperparameter landscape very noisy, or, in the case of squashing activation functions, systematically bias the landscape. A minimal width of 32 is recommended for the smallest matrix in a Transformer (likely $d_{head}$).

When training a narrow version of the target model by a factor of n, a speedup in $O(n^2)$ is rarely observed when the target model is not extremely wide. Thus, there are several bottlenecks causing this scaling efficiency. More specifically, a bottleneck occurs at layers whose runtime scales linearly in width, such as a projection to a large vocabulary space, and dominates the total runtime when the width is small. To avoid this type of bottleneck, the linearly scaled layers can be optimized by masking out tokens not used in loss calculations. Another bottleneck occurs when small matrices are inefficiently manipulated on GPUs, limiting how narrow the model can scale along specific width dimensions while staying efficient. To avoid this type of bottleneck, different width limits can be combined to avoid having extremely small matrices in the narrow network. Another type of bottleneck occurs when the batch size cannot be scaled quadratically due to vRAM constraints. To avoid this type of bottleneck, the amount of vRAM capacity can be increased and/or the scripts that use vRAM can be optimized to use less vRAM.

Current adaptive optimizers normalize the gradient coordinate-wise to O(1). This is not compatible with the ideal update rule which requires different update-to-weight ratios for layers of different shapes. Accordingly, a more principled change to the ADAM optimizer can be made to eliminate this update ratio mismatch.

The ADAM algorithm calculates a debiased first-moment estimate vector $\hat{m}_t$ and a debiased second-moment estimate vector $\hat{v}_t$. For a given learning rate the gradient update for a weight vector $\theta$ is calculated as $\theta_t \leftarrow \theta_{t-1} - \eta \cdot \hat{m}_t/(\sqrt{\hat{v}_t} + \epsilon)$, where $\epsilon$ is a small number for numerical stability. Accordingly, the update is coordinate-wise O(1) even as width becomes large. For a modified optimizer, which can be termed INFADAM, a subtle change may be implemented to the update. That is, the ADAM step can be calculated as usual $\Delta = \eta \cdot \hat{m}_t/(\sqrt{\hat{v}_t} + \epsilon)$. Then, the ADAM step can be normalized before applying it to the weight vector, $$\theta_t \leftarrow \theta_{t-1} - \frac{\Delta}{\|\Delta\|}.$$

This turns the coordinate-wise O(1) update to layer-wise O(1) which satisfies the update rule entailed by the feature-learning infinite-width limit.

Thus, using observations from neural network infinite-width theories, the hyperparameter landscape is sufficiently stable across neural networks of different width that share the same infinite-width limit. Accordingly, a very wide network can be tuned by tuning its smaller counterparts that share the same limit and transfer the hyperparameter to the full model. Such a technique is flexible in that it can define width differently and take a respective infinite-width limit separately or in tandem to build a much more efficient small neural network, given a large target network, such as GPT-3 or Turing-NLP.

FIG. 1 depicts an overview of an application of hyperparameter transfer based on the theory of infinite-width neural networks in accordance with examples of the present disclosure. The hyperparameter transfer process may be applied to the neural network model 104. The neural network model 104 may be a collection of connected units or nodes called artificial neurons; each node or neural loosely models the neurons in a biological brain. Each connection may transmit a signal, or data, to other neurons for additional processing. The "signal" at a connection is a real number, and the output of each neuron may be computed by some non-linear function of the sum of its inputs. The connections between neurons are called edges; neurons and edges typically have a weight that may be determined, or adjusted, during a training process according to one or more hyperparameters. A hyperparameter is a parameter whose value is used to control the learning process. Example types of hyperparameters include, but are not limited to, learning rate, batch size, and node initialization. Example types of neural networks include, but are not limited to convolutional neural networks, long short-term memory neural networks, recurrent neural networks, and Transformers.

Different model training algorithms require different hyperparameters. Hyperparameter optimization, or tuning, is the problem of choosing a set of optimal hyperparameters for a learning algorithm. Hyperparameter optimization utilizes an algorithm to find a tuple of hyperparameters that yields an optimal model which minimizes a predefined loss function on given independent data. Instead of the optimization algorithms used to train a neural network, no gradient is computed during the hyperparameter tuning process; accordingly, the hyperparameter tuning algorithm cannot rely on the gradient to lower the validation error. Instead, the hyperparameter tuning algorithm may blindly try a new configuration in the search space or make an educated guess of where the most interesting configuration might be. The hyper-parameter optimization algorithms can be separated into three main categories, namely, exhaustive search, surrogate models, and finally a combination of exhaustive search and surrogate models. Examples of exhaustive search algorithms include, but are not limited to grid search and random search algorithms. Examples of the surrogate modes includes, but are not limited to, Bayesian optimization and Tree-structured Parzen estimators (TPE).

The neural network model 104 may include a plurality of layers including an input layer, an output layer, and one or more hidden layers. Each layer may include a number of neurons, or elements, comprising the layer width. For example, the layer width may be of a known size $W_{Large}$, where $W_{Large}$ is sufficiently large such that the feature learning of the neural network model 104 can reasonably approximate the deterministic infinite-width limit of the model architecture. An infinitely wide neural network refers to a neural network exhibiting asymptotic properties associated with neural networks having a theoretically infinite width. That is, as the width of the neural network increases, the neural network may reasonably approximate the deterministic infinite-width limit of the model architecture or otherwise approach the asymptotic limits associated with the model architecture, where the asymptotic limits are identified as the width of the neural network approaches infinity. As $W_{Large}$ may contribute to the many hundreds of billions of parameters of the neural network model 104, the ability to tune and train such a model with a layer equal to $W_{Large}$ becomes problematic when considering the amount of computations required, the amount of energy required to achieve the computations, and the amount of time necessary to train such a model. For example, training a neural network model consisting of 175 billion parameters would take several thousand petaflop-days to train. Accordingly, large amounts of hardware capable of performing many petaflops per second and requiring vast amounts of electricity would be required. Accordingly, a large neural network and/or a large neural network model may require a high cost of compute including but not limited to large amounts of computing resources, large amounts of computing time, and/or large of amounts of energy to tune and train. As a non-limiting example, a large neural network model may have more than 1 billion parameters, more than 10 billion parameters, or more than 100 billion parameters. One of ordinary skill in the art may recognized that the high cost of computer may change depending on technology and over time, but one of ordinary skill in the art would recognize a neural network model that requires a high cost of compute to tune and train.

In accordance with examples of the present disclosure, the neural network model 104 may be parameterized and scaled such that the layer having width $W_{Large}$ now has width $W_{Small}$. Prior to scaling the neural network model 104, the neural network model 104 may be parameterized if such parameterization is necessary. That is, the neural network model 104 may first be parameterized according to the deterministic limit associated with the neural network model 104 having an infinite width. Thus, for example, where the neural network model 104 may not include certain hyperparameters, the parameterization process 105 for example, may add such hyperparameters. In some examples, where a hyperparameter exits, the hyperparameter may be adjusted or scaled. Accordingly, a parameterization scheme, plan, or design may be used based on a type of neural network, an architecture of the neural network, or an organization and/or size of the varying layers of the neural network to add hyperparameters when needed and/or to modify hyperparameters when needed. For example, where a transformer is used in a neural network, a parameterization scheme that includes a dot-product attention logit scaler hyperparameter may be used. As another example, where a transformer is not used in a neural network, a parameterization scheme that does not include a dot-product attention logit scaler hyperparameter may be used. As another example, a hyperparameter, such as an output logit scaling, may be equal to one before the application of a parameterization scheme whereas the same hyperparameter may have a value that is a function of the width of the last layer after the application of a parameterization scheme. The neural network model 104 may then be scaled to a narrower scaled model 108. A small neural network, or a smaller neural network, may be understood to be a neural network model having a cost of compute that is less than that of the large neural network model. In one example, a small neural network may have a number of parameters that is an order of magnitude less than the large neural network. In another example, a small neural network may have a number of parameters that is two orders of magnitude less than the large neural network.

As the most accurate results may be obtained for a neural network model 104 having $W_{Large}$, as the neural network model 104 is scaled to a model 108 that includes layers having fewer elements than $W_{Large}$, the results from the model 108 may be less accurate. However, there is a tradeoff in that the scaled model 108 may require less compute to reach a convergence and therefore require less energy and time. Accordingly, the model scaling process 107 may be based on an estimated amount of compute, energy, and/or time that is made available to tune one or more hyperparameters. It is also noted that the computational resources, energy, and time required for tuning and training a large model, such as a model with 175 billion parameters can be drastically reduced. For example, a model with 175 billion parameters may be scaled to one having 100 million parameters. Multiple passes can be made on the model having 100 million parameters during a tuning process. Once the hyperparameters are transferred from the smaller model to the large model, a single pass may only be needed. Accordingly, the amount of computations required, the amount of energy required, and the amount of time required associated with training and tuning a large model can be drastically reduced.

Accordingly, the hyperparameter tuning process 109 may occur using the smaller, or scaled model 108. Because the hyperparameter tuning process may operate relatively fast on the scaled model 108, there is generally sufficient compute, energy, and time that is available for the tuning process to make a plurality of passes, adjusting and identifying an optimized tuple of hyperparameters at each pass. As previously mentioned, such hyperparameters may be identified using an exhaustive search and/or surrogate method. Once the tuned hyperparameters 111 are identified, the tuned hyperparameters 111 are transferred to the large model 140 resulting in the tuned large model 112. In examples, the tuned large model 112 may be trained using a training set of data in order to assign weights to each node and result in a trained large model 112. In some examples, a minimal amount of passes, such as a single pass, are performed in order to obtain an accurate and trained model.

Figure 2:
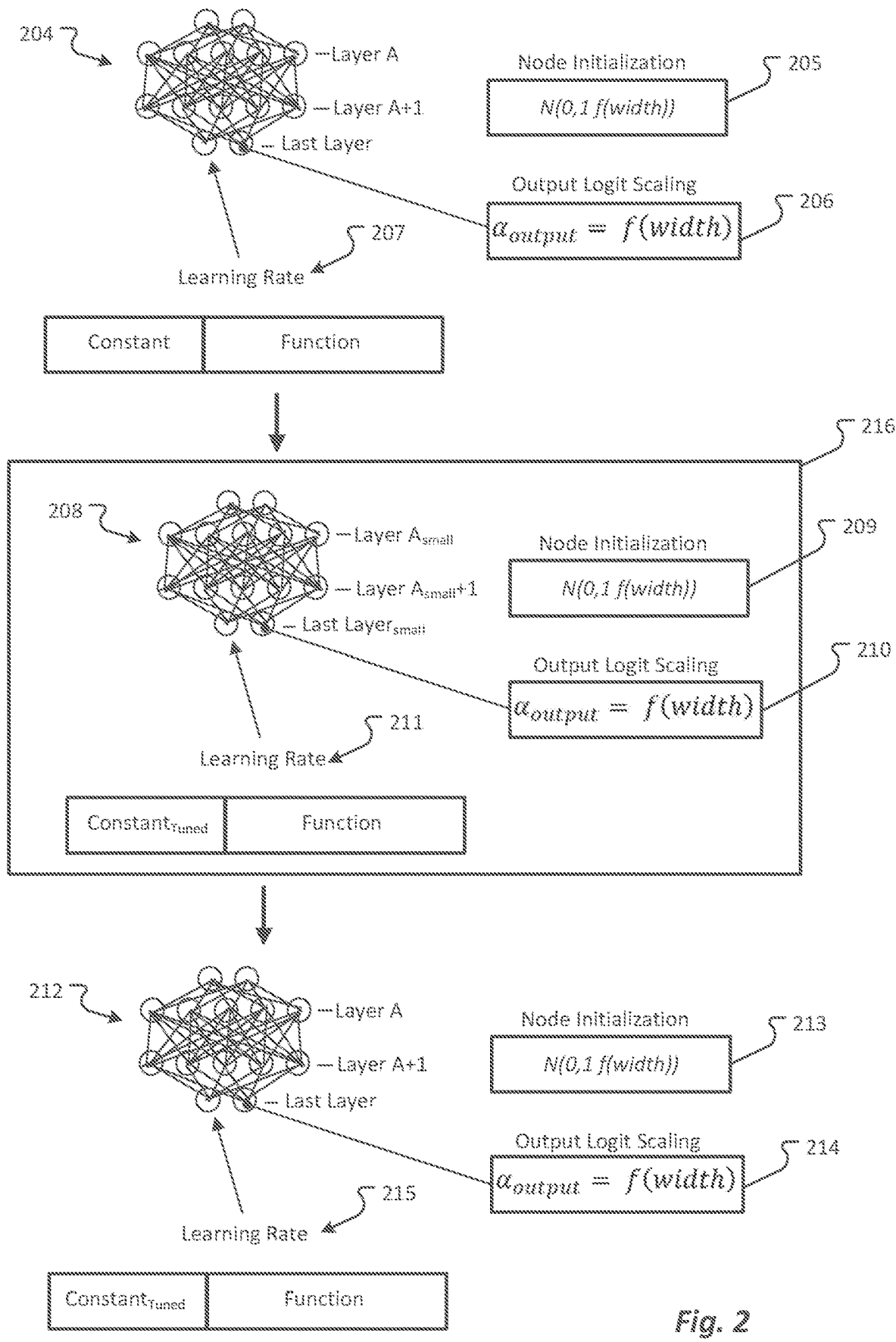
FIG. 2 depicts additional details directed to the application of hyperparameter transfer based on the theory of infinite-width neural networks in accordance with examples of the present disclosure.

FIG. 2 depicts additional details directed to the application of hyperparameter transfer based at least upon the theory of infinite-width neural networks in accordance with examples of the present disclosure. More specifically, a neural network model 204 may be the same as or similar to the neural network model 104. That is, the neural network model 204 may include layers A and A+1 having very large widths. As depicted in FIG. 2, hyperparameters of the neural network model 204 to tune, or optimize, may include, but are not limited to node initialization hyperparameter 205, output logit scaling hyperparameter 206, and learning rate hyperparameter 207. Of course, additional for fewer hyperparameters may be tuned as previously discussed herein.

The initialization of the nodes can be critical to the neural network's ultimate performance. During a parameterization process, the node initialization hyperparameter 205 may be configured in a manner such that a Gaussian initialization process as modified by a width dependent function (e.g., a function dependent on the number elements in the layer) is to be used, though other initialization processes may be performed without departing from the spirit of this disclosure. In example neural network models where the node initialization hyperparameter 205 is not present, the node initialization hyperparameter 205 is added as a hyperparameter for tuning. In other instances where the node initialization hyperparameter 205 has already been identified as a hyperparameter for tuning, the parameterization process of FIG. 2 may modify the already present node initialization hyperparameter such that it is based on the Gaussian initialization process as modified by a neural network width dependent function. In examples, the neural network width dependent function may be equal to, but not limited to, $$\frac{1}{\text{width}}, \frac{1}{\sqrt{\text{width}}}, \text{ or } \frac{1}{\text{width}^2}.$$

The output logit scaling hyperparameter 206 may also be an example hyperparameter for tuning. For example, during the parameterization process, the output logit scaling hyperparameter 206 may be configured as a scaling factor $\alpha_{output}$ which scales the output logits from the last layer of the neural network model 204. In examples, $\alpha_{output}$ is approximately equal to, but not limited to, $$\frac{c}{\text{width}}, \frac{c}{\sqrt{\text{width}}}, \text{ or } \frac{c}{\text{width}^2},$$

for some constant c. In example neural network models where the output logit scaling hyperparameter 206 is not present, the output logit scaling hyperparameter 206 is added as a hyperparameter for tuning. In other instances where the output logit scaling hyperparameter 206 has already been identified as a hyperparameter for tuning, the parameterization process of FIG. 2 may modify the already present output logit scaling hyperparameter such that it is approximately equal to, but not limited to, $$\frac{c}{\text{width}}, \frac{c}{\sqrt{\text{width}}}, \text{ or } \frac{c}{\text{width}^2},$$

for some constant c.

The learning rate hyperparameter 207 controls how much to change the model in response to the estimated error each time the model weights are updated. Choosing the learning rate is challenging as a value too small may result in a long training process that may not improve or change, whereas a value too large may result in learning a sub-optimal set of weights too fast or an unstable training process. The learning rate hyperparameter 207 may include a tunable constant and a function. During the parameterization process, the function of the learning rate hyperparameter 207 may be scaled by or otherwise consist of a width dependent function. In examples, the function of the learning rate hyperparameter 207 may be scaled by a function that is $$\frac{c}{\text{width}}, \frac{c}{\sqrt{\text{width}}}, \text{ or } \frac{c}{\text{width}^2},$$

for some constant c. In example neural network models where the learning rate hyperparameter 207 is not present, the learning rate hyperparameter 207 is added as a hyperparameter for tuning. In other instances where the learning rate hyperparameter 207 has already been identified as a hyperparameter for tuning, the parameterization process of FIG. 2 may modify the already present learning rate hyperparameter by adding or otherwise ensuring that the function is approximately equal to, but not limited to, $$\frac{c}{\text{width}}, \frac{c}{\sqrt{\text{width}}}, \text{ or } \frac{c}{\text{width}^2},$$

for some constant c.

The neural network model 204 may then be scaled based on one or more factors including, but not limited to, a desired accuracy, a desired amount of energy to expend, and/or an available amount of computing resources. For example, as a neural network model is scaled to a model having fewer parameters (e.g., smaller width), the neural network model generally takes fewer computing resources, less energy, and less time to tune and train. However, as the neural network model is scaled, an overall accuracy or performance of the neural network model may be decreased because the number of neurons, or parameters decrease. Accordingly, a tradeoff between accuracy and use of resources may be made based on a desired accuracy. A neural network model 208 having layers A and A+1 that are smaller than the layers A and A+1 of the neural network model 204 may be generated. A hyperparameter tuning process 216 may then be performed on the neural network model 208. As previously discussed, the hyperparameter tuning process may utilize an exhaustive search and/or a surrogate method to identify the hyperparameter values for the hyperparameters. As previously discussed, the node initialization hyperparameter 209 may be configured in a manner such that a Gaussian initialization process as modified by a width dependent function (e.g., a function dependent on the number elements in the layer) is be used. As another example, the output logic scaling hyperparameter 210 may be configured as a scaling factor $\alpha_{output}$ which scales the output logits from the last layer of the neural network model 208. In addition, the learning rate hyperparameter 211 may include a tuned constant and a function of width.

Once the hyperparameter tuning process is complete, the tuned hyperparameters may be transferred back to the neural network model 204 resulting in a tuned neural network model 212. Accordingly, a neural network model 212 having layers A and A+1 that are larger than the layers A and A+1 of the neural network model 204 may be generated. As a non-limiting example, the node initialization hyperparameter 213 may be configured in a manner such that a Gaussian initialization process as modified by a width dependent function (e.g., a function dependent on the number elements in the layer) is used. As another example, the node initialization hyperparameter 213 may be configured to use variance scaling, constant value, or another node initialization process as modified by a width dependent function. As another example, the output logic scaling hyperparameter 214 is configured as a scaling factor $\alpha_{output}$ which scales the output logits from the last layer of the neural network model 212. In addition, the learning rate hyperparameter 215 may include a tuned constant and function, where function is scaled by or otherwise consists of a width dependent function. The neural network model 212 may be trained utilizing the node initialization hyperparameter 213, the output logic scaling hyperparameter 214, and/or the learning rate hyperparameter 215.

Figure 3:
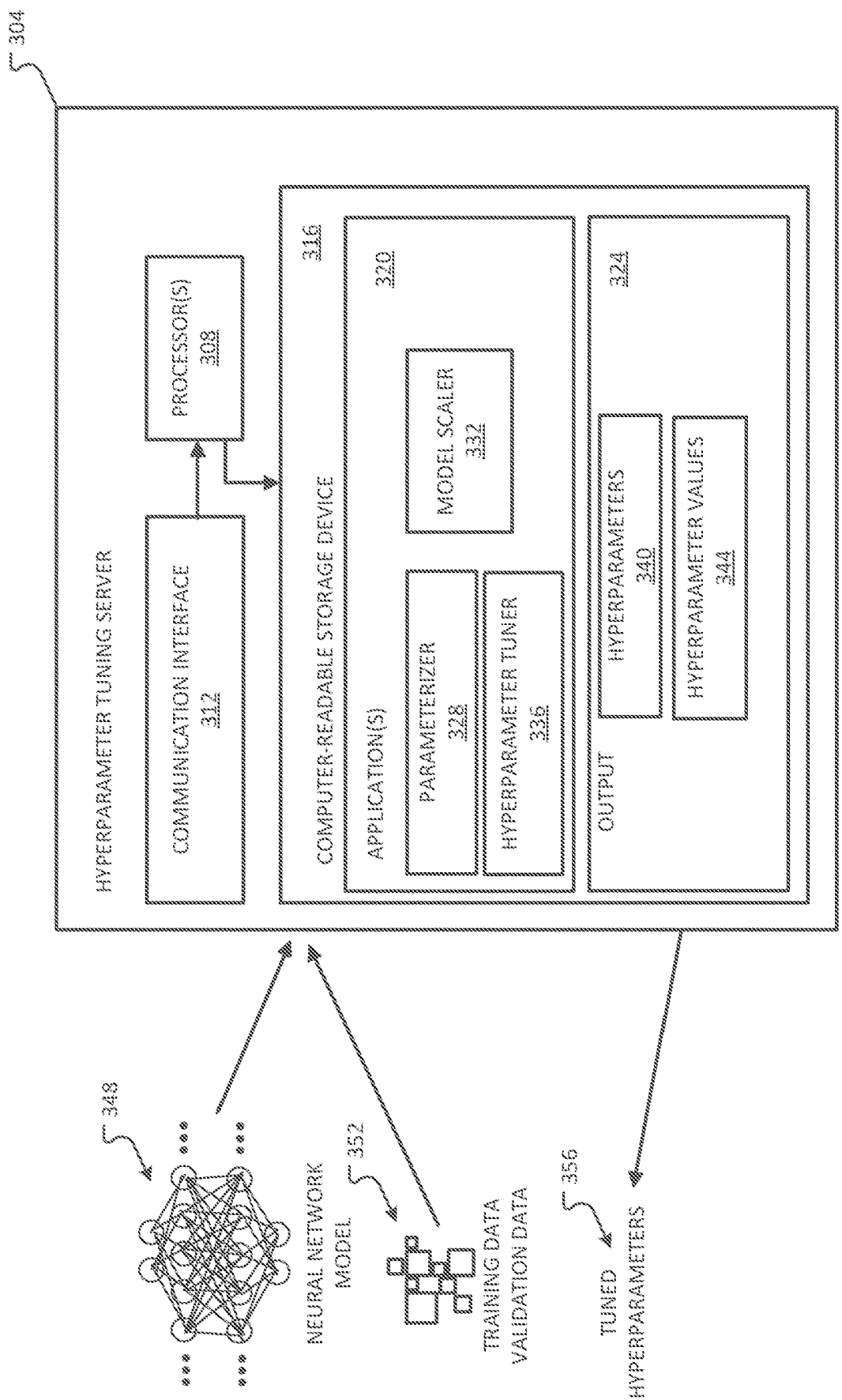
FIG. 3 depicts a hyperparameter tuning server 304 in accordance with examples of the present disclosure.

FIG. 3 depicts a hyperparameter tuning server 304 in accordance with examples of the present disclosure. In one example, the hyperparameter tuning server 304 includes one or more processor(s) 308, one or more communication interface(s) 312, and a computer-readable storage device 316 that stores computer-executable instructions for one or more applications 320 and output 324 resulting from one or more functionalities of the applications 320.

The various functional components of the hyperparameter tuning server 304 may reside on a single device or may be distributed across several computing devices in various arrangements. The various components of the networked hyperparameter tuning server 304 may access one or more databases and each of the various components of the hyperparameter tuning server 304 may be in communication with one another. Further, while the components of FIG. 3 are discussed in the singular sense, it will be appreciated that in other examples multiple instances of the components may be employed.

The one or more processors 308 may be any type of commercially available processor, such as processors available from the Intel Corporation, Advanced Micro Devices, Texas Instruments, or other such processors. Further still, the one or more processors 308 may include one or more special-purpose processors, such as a Field-Programmable Gate Array (FPGA) or an Application Specific Integrated Circuit (ASIC). The one or more processors 308 may also include programmable logic or circuitry that is temporarily configured by software to perform certain operations. Thus, once configured by such software, the one or more processors 308 become specific machines (or specific components of a machine) uniquely tailored to perform the configured functions and are no longer general-purpose processors.

The one or more communication interfaces 312 are configured to facilitate communications between the hyperparameter tuning server 304, one or more client devices, and one or more of the database server(s). The one or more communication interfaces 312 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The computer-readable storage device 316 includes various applications 320 and output 324 for implementing the hyperparameter tuning server 304. The computer-readable storage device 316 includes one or more devices configured to store instructions and data temporarily or permanently and may include, but not be limited to, random-access memory(RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the application(s) 320 and the output 324. Accordingly, the computer-readable storage device 316 may be implemented as a single storage apparatus or device, or, alternatively and/or additionally, as "cloud-based" storage systems or storage networks that include multiple storage apparatus or devices. The computer-readable storage device 316 may exclude signals per se.

In one aspect, the applications 320 are written in a computer-programming and/or scripting language. Examples of such languages include, but are not limited to, C, C++, Java, JavaScript, Perl, Python, or any other computer programming and/or scripting language now known or later developed.

With reference to FIG. 3, the applications 320 of the hyperparameter tuning server 304 include, but are not limited to, a parameterizer 328, a hyperparameter tuner 336, and a model scaler 332. The output 324 may include, but is not limited to the hyperparameters 340 and the associated hyperparameter values 344. That is, the hyperparameter tuning server 304 may receive a neural network model 348 and training data 352, parameterize the neural network model 348, scale the received neural network model 348 to a reduced size, and tune or otherwise optimize the hyperparameters for the scaled neural network model. The hyperparameter tuning server 304 may then output the hyperparameters 340 and/or the hyperparameter values 344 as the tuned hyperparameters 356.

The parameterizer 328 is configured to perform parameterization on the neural network model 348. That is, in instances where the neural network model 348 is not parameterized in a manner required by or otherwise necessitated by the hyperparameter scaling and transfer process described herein, the parameterizer 328 will generate or modify hyperparameters for tuning. For example, during a parameterization process, the node initialization hyperparameter 205 may be configured in a manner such that a Gaussian initialization process as modified by a width dependent function (e.g., a function dependent on the number elements in the layer) is to be used. In example neural network models where the node initialization hyperparameter 205 is not present, the node initialization hyperparameter 205 is added as a hyperparameter for tuning. In other instances where the node initialization hyperparameter 205 has already been identified as a hyperparameter for tuning, the parameterizer may modify the already present node initialization hyperparameter such that it is based on the Gaussian initialization process as modified by a neural network width dependent function. In examples, the neural network width dependent function may be equal to, but not limited to, $$\frac{1}{\text{width}}, \frac{1}{\sqrt{\text{width}}}, \text{ or } \frac{1}{\text{width}^2}.$$

As another example, the output logit scaling hyperparameter 206 may be configured as a scaling factor $\alpha_{output}$ which scales the output logits from the last layer of the neural network model 204. In examples, $\alpha_{output}$ is approximately equal to, but not limited to, $$\frac{c}{\text{width}}, \frac{c}{\sqrt{\text{width}}}, \text{ or } \frac{c}{\text{width}^2},$$

for some constant c. In example neural network models where the output logit scaling hyperparameter 206 is not present, the output logit scaling hyperparameter 206 is added as a hyperparameter for tuning. In other instances where the output logit scaling hyperparameter 206 has already been identified as a hyperparameter for tuning, the parameterizer may modify the already present output logit scaling hyperparameter such that it is approximately equal to, but not limited to, $$\frac{c}{\text{width}}, \frac{c}{\sqrt{\text{width}}}, \text{ or } \frac{c}{\text{width}^2},$$

for some constant c. During the parameterization process, the function of the learning rate hyperparameter 207 may be scaled by or otherwise consist of a width dependent function. In examples, the function of the learning rate hyperparameter 207 may be scaled by a function that is $$\frac{c}{\text{width}}, \frac{c}{\sqrt{\text{width}}}, \text{ or } \frac{c}{\text{width}^2},$$

for some constant c. In example neural network models where the learning rate hyperparameter 207 is not present, the learning rate hyperparameter 207 is added as a hyperparameter for tuning. In other instances where the learning rate hyperparameter 207 has already been identified as a hyperparameter for tuning, the parameterizer may modify the already present learning rate hyperparameter by adding or otherwise ensuring that the function is approximately equal to, but not limited to, $$\frac{c}{\text{width}}, \frac{c}{\sqrt{\text{width}}}, \text{ or } \frac{c}{\text{width}^2},$$

for some constant c. Of course, hyperparameters other than the node initialization hyperparameters, the output logit scaling hyperparameter, and the learning rate hyperparameters are contemplated. The constant c may be equal to any real number, such as but not limited to 1, 1.5, 2, 2.2 etc.

The model scaler 332 is configured to receive the parameterized neural network model 348 and scale the neural network model 348 to a smaller size. As previously discussed, the scaling of the neural network model 348 may be based on a desired accuracy, an availability of computing resources, an available of energy, and/or an availability of time. For example, a layer, such as Layer A in FIG. 2 may be scaled from a very large size of 32,000 elements to a small size of 256 elements. The scaled neural network model may then be provided to the hyperparameter tuner 336. The hyperparameter tuner 336 may utilize an exhaustive search model, a surrogate model, and/or a combination of exhaustive search model and the surrogate models.

The hyperparameter tuning server 304 may be configured to provide the output 324 including the hyperparameters 340 and the hyperparameter values 344 as tuned hyperparameter 356. Accordingly, the amount of time required to tune or otherwise optimize hyperparameters associated with a neural network may drop from nine days for example down to one day—taking less compute time and les energy to calculate.

Figure 4:
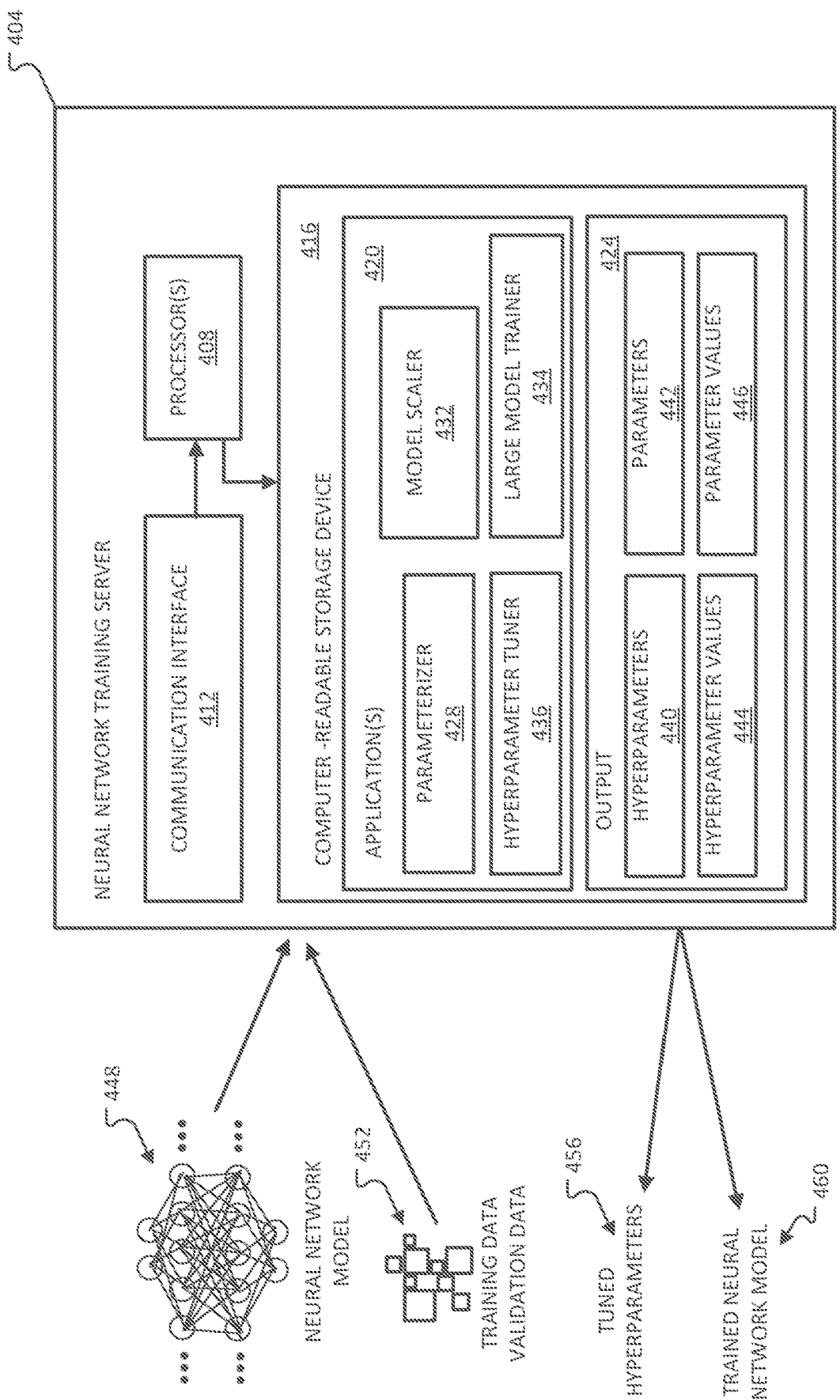
FIG. 4 depicts a neural network training server 404 in accordance with examples of the present disclosure.

FIG. 4 depicts a neural network training server 404 in accordance with examples of the present disclosure. In one example, the neural network training server 404 includes one or more processor(s) 408, one or more communication interface(s) 412, and a computer-readable storage device 416 that stores computer-executable instructions for one or more applications 420 and output 424 resulting from one or more functionalities of the applications 420.

The various functional components of the neural network training server 404 may reside on a single device or may be distributed across several computing devices in various arrangements. The various components of the neural network training server 404 may access one or more databases and each of the various components of the neural network training server 404 may be in communication with one another. Further, while the components of FIG. 4 are discussed in the singular sense, it will be appreciated that in other examples multiple instances of the components may be employed.

The one or more processors 408 may be any type of commercially available processor, such as processors available from the Intel Corporation, Advanced Micro Devices, Texas Instruments, or other such processors. Further still, the one or more processors 408 may include one or more special-purpose processors, such as a Field-Programmable Gate Array (FPGA) or an Application Specific Integrated Circuit (ASIC). The one or more processors 408 may also include programmable logic or circuitry that is temporarily configured by software to perform certain operations. Thus, once configured by such software, the one or more processors 408 become specific machines (or specific components of a machine) uniquely tailored to perform the configured functions and are no longer general-purpose processors.

The one or more communication interfaces 412 are configured to facilitate communications between the neural network training server 404, one or more client devices, and one or more of the database server(s). The one or more communication interfaces 412 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The computer-readable storage device 416 includes various applications 420 and output 424 for implementing the neural network training server 404. The computer-readable storage device 416 includes one or more devices configured to store instructions and data temporarily or permanently and may include, but not be limited to, random-access memory(RAM), read-only memory (ROM), buffer memory, flash memory, optical media, magnetic media, cache memory, other types of storage (e.g. Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the application(s) 420 and the output 424. Accordingly, the computer-readable storage device 416 may be implemented as a single storage apparatus or device, or, alternatively and/or additionally, as "cloud-based" storage systems or storage networks that include multiple storage apparatus or devices. The computer-readable storage device 416 may exclude signals per se.

In one example, the applications 420 are written in a computer-programming and/or scripting language. Examples of such languages include, but are not limited to, C, C++, Java, JavaScript, Perl, Python, or any other computer programming and/or scripting language now known or later developed.

With reference to FIG. 4, the applications 420 of the neural network training server 404 include, but are not limited to, a parameterizer 428, a hyperparameter tuner 436, a model scaler 432, and a large model trainer 434. The output 424 may include, but is not limited to the hyperparameters 440 and the associated hyperparameter values 444. The output 424 may additionally include, parameters 442 and parameter values 446. The neural network training server 404 may receive a neural network model 448 and training data 452, parameterize the neural network model 448, scale the received neural network model 448 to a reduced size, tune or otherwise optimize the hyperparameters for the scaled neural network model, transfer the hyperparameters from the hyperparameter tuner 436 to the large neural network model 448 and then train the large neural network model 448 using the transferred hyperparameters. The neural network training server 404 may then output the tuned hyperparameters 440 and the hyperparameter values 444 as the tuned hyperparameters 456; the neural network training server 404 may output the parameters 442 and the parameter values 446 as the trained neural network model 460. In some examples, only the tuned hyperparameters 456 are output. In some examples, only the trained neural network model 460 is output.

The parameterizer 428 is configured to perform parameterization on the neural network model 448. That is, in instances where the neural network model 448 is not parameterized in a manner required by or otherwise necessitated by the hyperparameter scaling and transfer process described herein, the parameterizer 428 will generate or modify hyperparameters for tuning. For example, during a parameterization process, the node initialization hyperparameter 205 may be configured in a manner such that a Gaussian initialization process as modified by a width dependent function (e.g., a function dependent on the number elements in the layer) is to be used. In example neural network models where the node initialization hyperparameter 205 is not present, the node initialization hyperparameter 205 is added as a hyperparameter for tuning. In other instances where the node initialization hyperparameter 205 has already been identified as a hyperparameter for tuning, the parameterizer may modify the already present node initialization hyperparameter such that it is based on the Gaussian initialization process as modified by a neural network width dependent function. In examples, the neural network width dependent function may be equal to, but not limited to, $$\frac{1c}{\text{width}}, \frac{c}{\sqrt{\text{width}}}, \text{ or } \frac{c}{\text{width}^2},$$

for some constant c. As another example, the output logit scaling hyperparameter 206 may be configured as a scaling factor $\alpha_{output}$ which scales the output logits from the last layer of the neural network model 204. In examples, $\alpha_{output}$ is approximately equal to, but not limited to, $$\frac{c}{\text{width}}, \frac{c}{\sqrt{\text{width}}}, \text{ or } \frac{c}{\text{width}^2},$$

for some constant c. In example neural network models where the output logit scaling hyperparameter 206 is not present, the output logit scaling hyperparameter 206 is added as a hyperparameter for tuning. In other instances where the output logit scaling hyperparameter 206 has already been identified as a hyperparameter for tuning, the parameterizer may modify the already present output logit scaling hyperparameter such that it is approximately equal to, but not limited to, $$\frac{c}{\text{width}}, \frac{c}{\sqrt{\text{width}}}, \text{ or } \frac{c}{\text{width}^2},$$

for some constant c. During the parameterization process, the function of the learning rate hyperparameter 207 may be scaled by or otherwise consist of a width dependent function. In examples, the function of the learning rate hyperparameter 207 may be scaled by a function that is $$\frac{c}{\text{width}}, \frac{c}{\sqrt{\text{width}}}, \text{ or } \frac{c}{\text{width}^2},$$

for some constant c. In example neural network models where the learning rate hyperparameter 207 is not present, the learning rate hyperparameter 207 is added as a hyperparameter for tuning. In other instances where the learning rate hyperparameter 207 has already been identified as a hyperparameter for tuning, the parameterizer may modify the already present learning rate hyperparameter by adding or otherwise ensuring that the function is approximately equal to, but not limited to, $$\frac{c}{\text{width}}, \frac{c}{\sqrt{\text{width}}}, \text{ or } \frac{c}{\text{width}^2},$$

for some constant c. Of course, hyperparameters other than the node initialization hyperparameters, the output logit scaling hyperparameter, and the learning rate hyperparameters are contemplated. The constant c may be equal to any real number, such as but not limited to 1, 1.5, 2, 2.5 etc.

The model scaler 432 is configured to receive the parameterized neural network model 448 and scale the neural network model 448 to a smaller size. As previously discussed, the scaling of the neural network model 448 may be based on a desired accuracy, an availability of computing resources, an available of energy, and/or an availability of time. For example, a layer, such as Layer A in FIG. 2 may be scaled from a very large size of 32,000 elements to a small size of 256 elements. The scaled neural network model may then be provided to the hyperparameter tuner 436. The hyperparameter tuner 436 may utilize an exhaustive search model, a surrogate model, and/or a combination of exhaustive search model and the surrogate models. Once the hyperparameters are available from the hyperparameter tuner 436, the neural network training server 404 may provide the tuned hyperparameters to the large model trainer 434. The large model trainer 434 may then utilize the tuned hyperparameters to train the neural network model 448 based on the training data 452 or another dataset.

The neural network training server 404 may be configured to provide the output 424 including the hyperparameters 440 and the hyperparameter values 444 as tuned hyperparameter 456. In addition, the neural network training server 404 may provide the parameters 442 and the parameter values 446 as the trained neural network model 460. Accordingly, the amount of time required to tune or otherwise optimize hyperparameters associated with a neural network may drop from nine days for example down to one day—taking less compute time and les energy to calculate. In addition, the time required to train the neural network model may be reduced as well because the amount of time associated with tuning the hyperparameters has been decreased.

Figure 5:
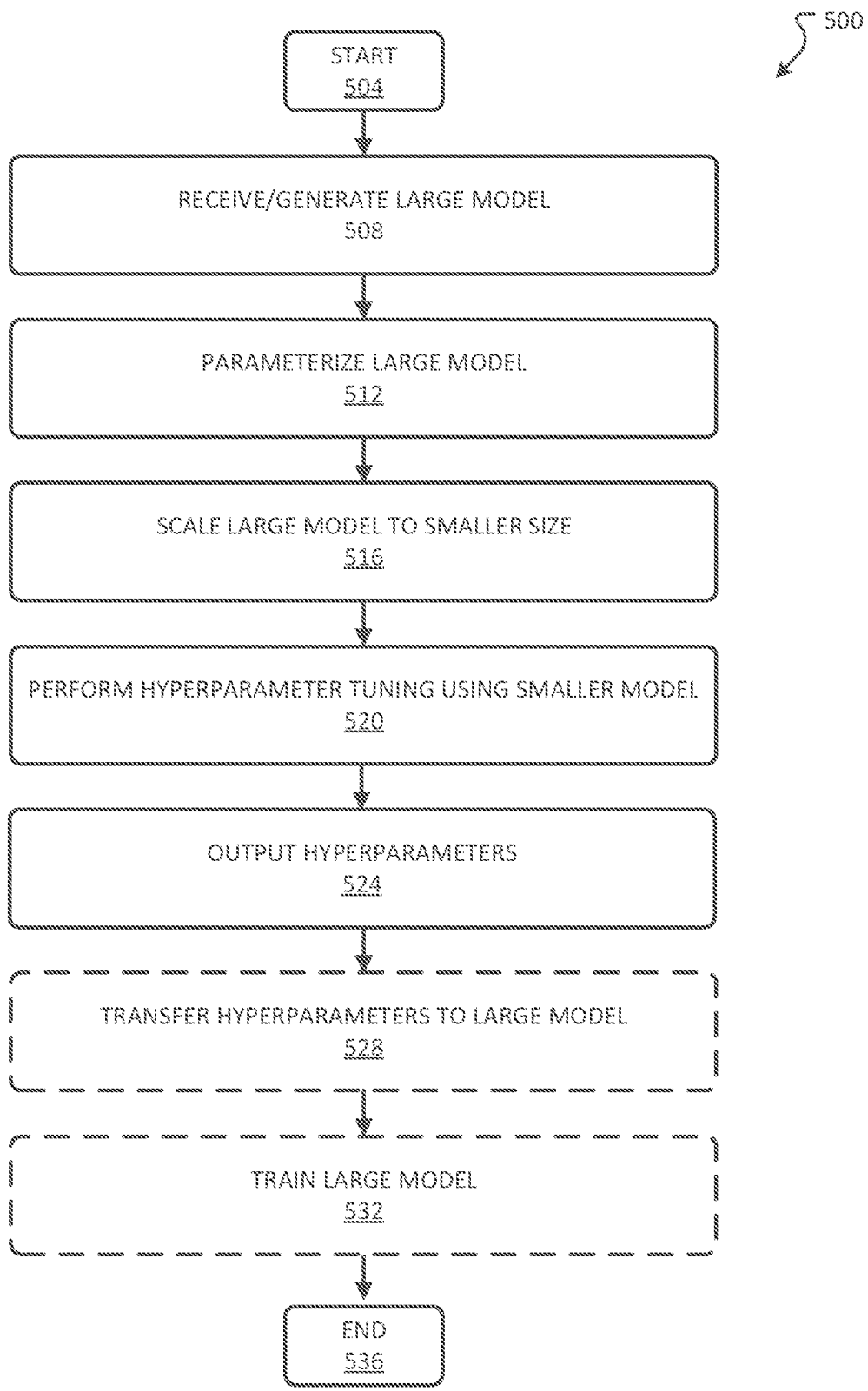
FIG. 5 depicts details of a method 500 for the application of hyperparameter transfer in accordance with examples of the present disclosure.

FIG. 5 depicts details of a method 500 for the application of hyperparameter transfer in accordance with examples of the present disclosure. A general order for the steps of the method 500 is shown in FIG. 5. Generally, the method 500 starts at 504 and ends at 536. The method 500 may include more or fewer steps or may arrange the order of the steps differently than those shown in FIG. 5. The method 500 can be executed as a set of computer-executable instructions executed by a computing system, such as but not limited to the hyperparameter tuning server 304 and the neural network training server 404, and encoded or stored on a computer readable medium. Further, the method 500 can be performed by gates or circuits associated with a processor, Application Specific Integrated Circuit (ASIC), a field programmable gate array (FPGA), a system on chip (SOC), or other hardware device. Hereinafter, the method 500 shall be explained with reference to the systems, components, modules, software, data structures, user interfaces, etc. described in conjunction with FIGS. 1-4.

The method starts at 504, where flow may proceed to 508. At 508, a large model, such as a neural network having a large amount of elements, or nodes, in each layer may be received, generated, or otherwise identified. For example, a user may desire to tune hyperparameters for a large neural network model that the user possesses or otherwise controls. Accordingly, the user may upload the large neural network model or otherwise provide the large neural network model as part of 508. As another example, a user may have a dataset that they provide to a server or service, such as the neural network training server 404. The neural network training server may then analyze the dataset and select a large neural network model based on the analyzed dataset. In some examples, the neural network training server 404 may generate a large neural network based on the dataset. The method 500 may then proceed to 512 such that the large neural network model may be parameterized. In some examples, where the neural network training server 404 generates and in some cases, identifies a neural network for use with a dataset, the parameterization step 512 may not be necessary. That is, the neural network training server 404 may generate or otherwise identify a large neural network model that has already been parameterized. In other instances, method 500 may parameterize the large neural network model.

For example, at 516, method 500 may determine that a Gaussian initialization process as modified by a width dependent function (e.g., a function dependent on the number elements in the layer) is to be used. In example neural network models where one or more node initialization hyperparameters are not present, the node initialization hyperparameter may be added as a hyperparameter for tuning. In other instances where the node initialization hyperparameter has already been identified as a hyperparameter for tuning, an existing hyperparameter may be modified such that it is based on the Gaussian initialization process as modified by a neural network width dependent function. As another example, an output logic scaling hyperparameter may be configured as a scaling factor $\alpha_{output}$ which scales the output logits from the last layer of the large neural network as a function of width. In example neural network models where the output logit scaling hyperparameter is not present, the output logit scaling hyperparameter ma be added as a hyperparameter for tuning. In other instances, where the output logit scaling hyperparameter has already been identified as a hyperparameter for tuning, the method 500 may modify the already present output logit scaling hyperparameter such that it is a function of a width of the layer—otherwise known as the number of elements in the layer. During the parameterization process, the function of the learning rate hyperparameter may be scaled by or otherwise consist of a width dependent function. In examples, the function of the learning rate hyperparameter may be scaled by a function of width. In example neural network models where the learning rate hyperparameter is not present, the learning rate hyperparameter is added as a hyperparameter for tuning. In other instances where the learning rate hyperparameter 207 has already been identified as a hyperparameter for tuning, the method 500 may modify the already present learning rate hyperparameter by adding or otherwise ensuring that the function is a function of width. Of course, hyperparameters other than the node initialization hyperparameters, the output logit scaling hyperparameter, and the learning rate hyperparameters are contemplated. For example, one or more neural networks may include a transformer; accordingly, such neural network may include a dot-product attention logit scaler hyperparameter which may be a function of width.

The method may proceed to 516 where the large neural network model may be scaled to a smaller size, such as a more narrow model. As previously discussed, the scaling of the neural network model may be based on a desired accuracy, an availability of computing resources, an available of energy, and/or an availability of time. For example, a layer may be scaled from a very large size to a smaller size. The method 500 may then proceed to 520, where the hyperparameter tuning, or optimization process, may occur. For example, an exhaustive search model, a surrogate model, and/or a combination of exhaustive search model and the surrogate models may be utilized to tune or otherwise optimize the hyperparameters using the smaller neural network model. Once the hyperparameters have been tuned, the method 500 may proceed to 524, where the hyperparameters may be output. For example, the tuned hyperparameters, based on the tuning of the small neural network, may be output or otherwise made available to a requester as a trained set of hyperparameters. In some examples, the tuned hyperparameters may be transferred to the large neural network model—for example the neural network model received, generated, or otherwise identified at 508. That is, the tuned hyperparameters obtained from applying a tuning process to the smaller neural network model may be transferred directly to the larger neural network. In some examples, the large neural network model may then be trained at 532. For example, the large neural network, using the transferred and tuned hyperparameters may be trained to output a trained model. Such training may include identifying weights for each node of the larger neural network. As previously discussed, both 528 and/or 532 may be optional, as they may be performed at a different time, different location, or not at all. For example, a trained set of hyperparameters may be transferred to large model at a later point in time. That is, a requestor may request tuned hyperparameters; once the tuned hyperparameters are available, the tuned hyperparameters may be provided to the requestor in the form of data, such as a set of tuned hyperparameters. The requestor may then apply the tuned hyperparameters at their leisure and train the large neural network model. The method 500 may end at 536.

Figure 6:
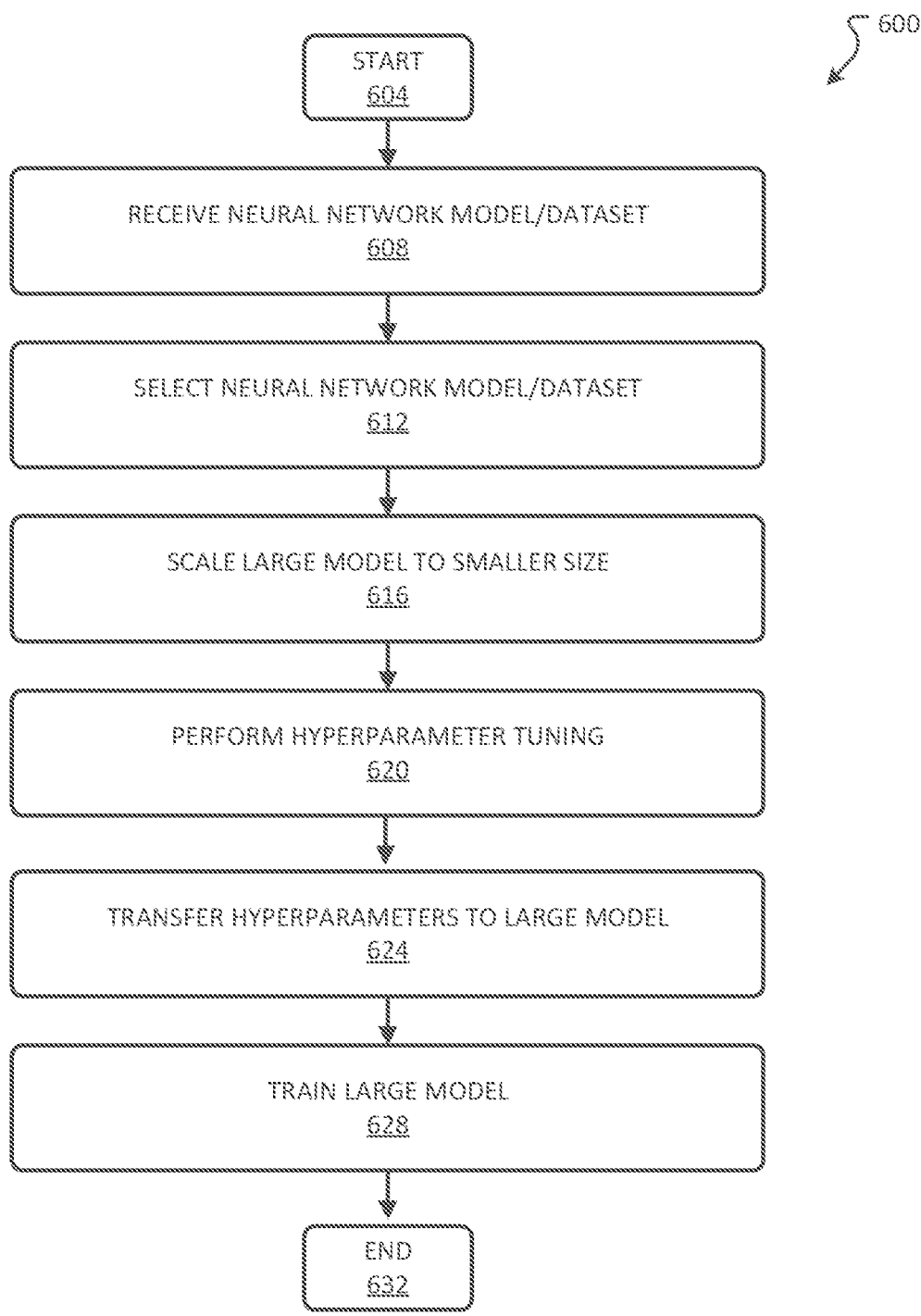
FIG. 6 depicts details of another method 600 for the application of hyperparameter transfer together with model training in accordance with examples of the present disclosure.

FIG. 6 depicts details of another method 600 for the application of hyperparameter transfer together with model training in accordance with examples of the present disclosure. A general order for the steps of the method 600 is shown in FIG. 6. Generally, the method 600 starts at 604 and ends at 632. The method 600 may include more or fewer steps or may arrange the order of the steps differently than those shown in FIG. 6. The method 600 can be executed as a set of computer-executable instructions executed by a computing system, such as but not limited to the hyperparameter tuning server 304 and the neural network training server 404, and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method starts at 604, where flow may proceed to 608. At 608, a large model, such as a neural network having a large amount of elements, or nodes, in each layer may be received; alternatively, or in addition, a dataset may be received at 608. For example, a user may upload or provide a location of a neural network model. Alternatively, or in addition, a user may upload or provide location of a data set. The method 600 may proceed to 612 where a neural network or a dataset may be selected. For example, where a neural network model is provided at 608, a dataset may be selected or determined. That is, a user may provide a neural network model for training but lacks a dataset or example data specific to a category or desired input. For example, a user may supply a medical diagnostic neural network but lack the necessary example data for training over one or more conditions such that the neural network generalizes well once trained. Accordingly, the method 600 may select or otherwise identify a dataset that is to be used for model training. In some examples, the method 600 may identify or otherwise select a model based on a user supplied dataset. For example, a user may supply a dataset that includes acquired data indicative of one or more medical conditions. Accordingly, the method 600 may identify a neural network model based on the user provided dataset.

The method 600 may proceed to 616 where the large neural network may be scaled to a smaller size. As previously discussed, the scaling of the neural network model may be based on a desired accuracy, an availability of computing resources, an available of energy, and/or an availability of time. For example, a layer may be scaled from a very large size to a smaller size to reduce the computation demand, energy consumption, or memory usage. The method 600 may then proceed to 620, where a hyperparameter tuning, or optimization process, may occur. For example, an exhaustive search model, a surrogate model, and/or a combination of exhaustive search model and the surrogate models may be utilized to tune or otherwise optimize the hyperparameters using the smaller neural network model. In some examples, the hyperparameter tuning process may generate additional hyperparameters and/or parameterize existing hyperparameters in order to transfer hyperparameters tuned on the small-scale neural network model to the large neural network model. As previously discussed, the hyperparameters may include, but are not limited to the initial weight initializations for each node, the output logit scaling hyperparameter, and the learning rate hyperparameters. Of course, other hyperparameters may be utilized as well.

Once the hyperparameters have been tuned, the method 600 may proceed to 624, where the hyperparameters may be transferred to the large neural network. In examples, the hyperparameters tuned using the smaller neural network may be plugged into or otherwise used by the large neural network. That is, the hyperparameters may not be scaled or modified prior to being utilized by the larger neural network. Rather, and for example, the learning rate acquired during the smaller neural network tuning may be applied to the large neural network. For example, a learning rate of the large neural network may equal the tuned learning rate acquired from the smaller neural network. In some instances, the tuned hyperparameter received from the smaller neural network and applied to the large neural network may include a function; although the function may be applied with different inputs (e.g., different widths), the function itself may be the same. At 628, the larger neural network may be trained using the tuned hyperparameters transferred from the small neural network. Once the large neural network has been trained, the neural network may be utilized to make predictions based on input data, classify data input into the model, and/or perform another function or calculation based on the input data. The method 600 may end at 632.

Figure 7:
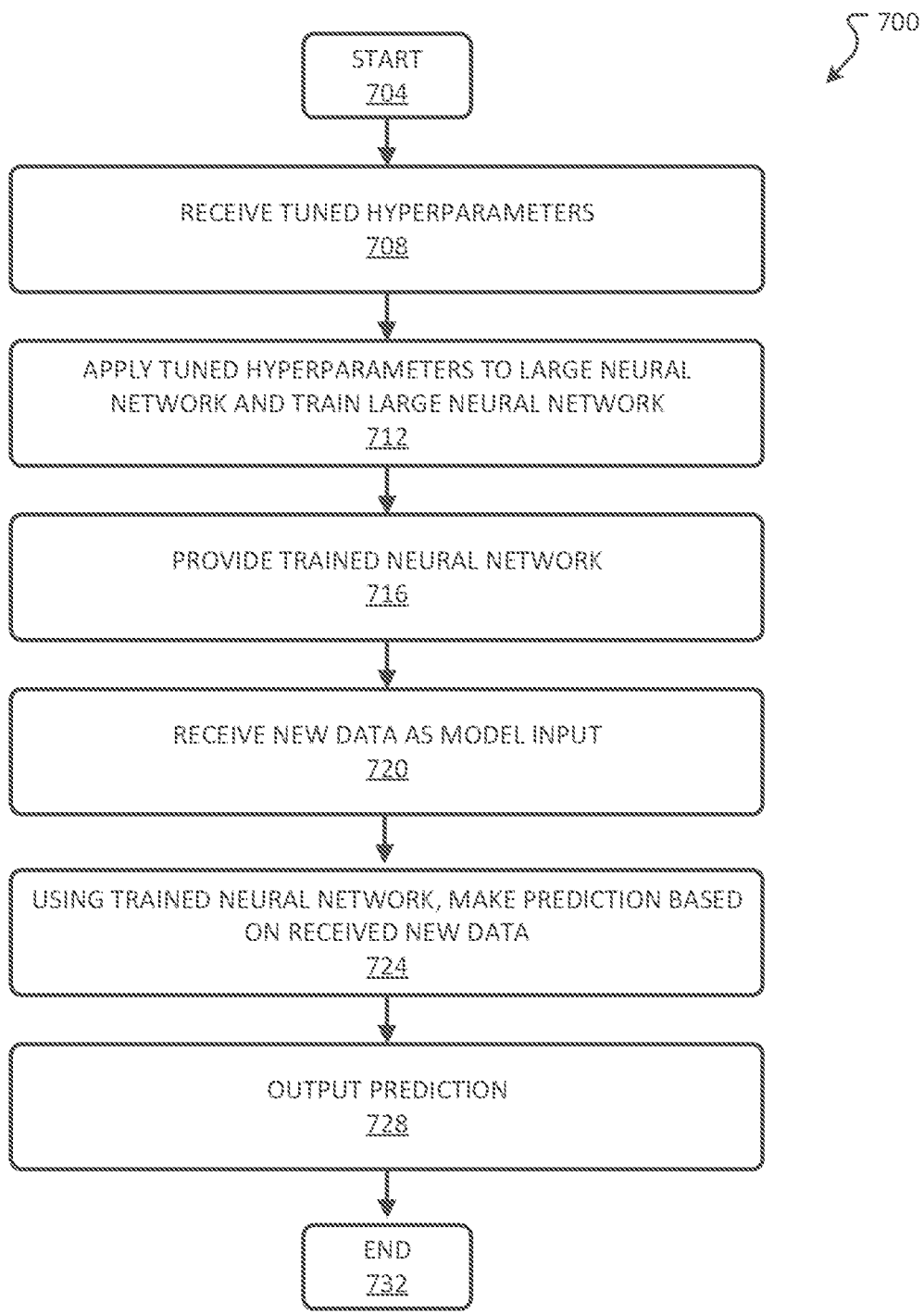
FIG. 7 depicts details of a method 700 for the transferring and using tune hyperparameters in accordance with examples of the present disclosure.

FIG. 7 depicts details of a method 700 for the transferring and using tune hyperparameters in accordance with examples of the present disclosure. A general order for the steps of the method 700 is shown in FIG. 7. Generally, the method 700 starts at 704 and ends at 732. The method 700 may include more or fewer steps or may arrange the order of the steps differently than those shown in FIG. 7. The method 700 can be executed as a set of computer-executable instructions executed by a computing system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method starts at 704, where flow may proceed to 708. At 708, tuned hyperparameters may be received; for example, the tuned hyperparameters may be received as a set of hyperparameters in response to a request for tuned hyperparameters based on a user provided large neural network model or dataset. As another example, the tuned hyperparameters may be provided by steps 524 of method 500 and/or 624 of method 600. Once the tuned hyperparameters are received, the method 700 may transfer the tuned hyperparameters to large neural network. Once the tuned hyperparameters have been transferred, the large neural network may be trained using a training dataset. As previously mentioned, because the hyperparameters have been tuned using a smaller network, the amount of time required to train the large neural network is ultimately reduced and the amount of computational resources are decreased, as the step of tuning hyperparameters is reduced and/or eliminated altogether.

Accordingly, once trained, the trained neural network may be provided or otherwise made available for use at 716. For example, an application using the large trained neural network model may receive new data as input at 720. The application may feed the new data to the trained neural network model and the trained neural network model may provide a prediction at 724 based on the new data. As an example, the prediction may be a predicted classification, a predicted value, or a predicted word. The prediction may be output at 728 such that one or more decisions may be made based on the output prediction. The method 700 may end at 732.

Figure 8:
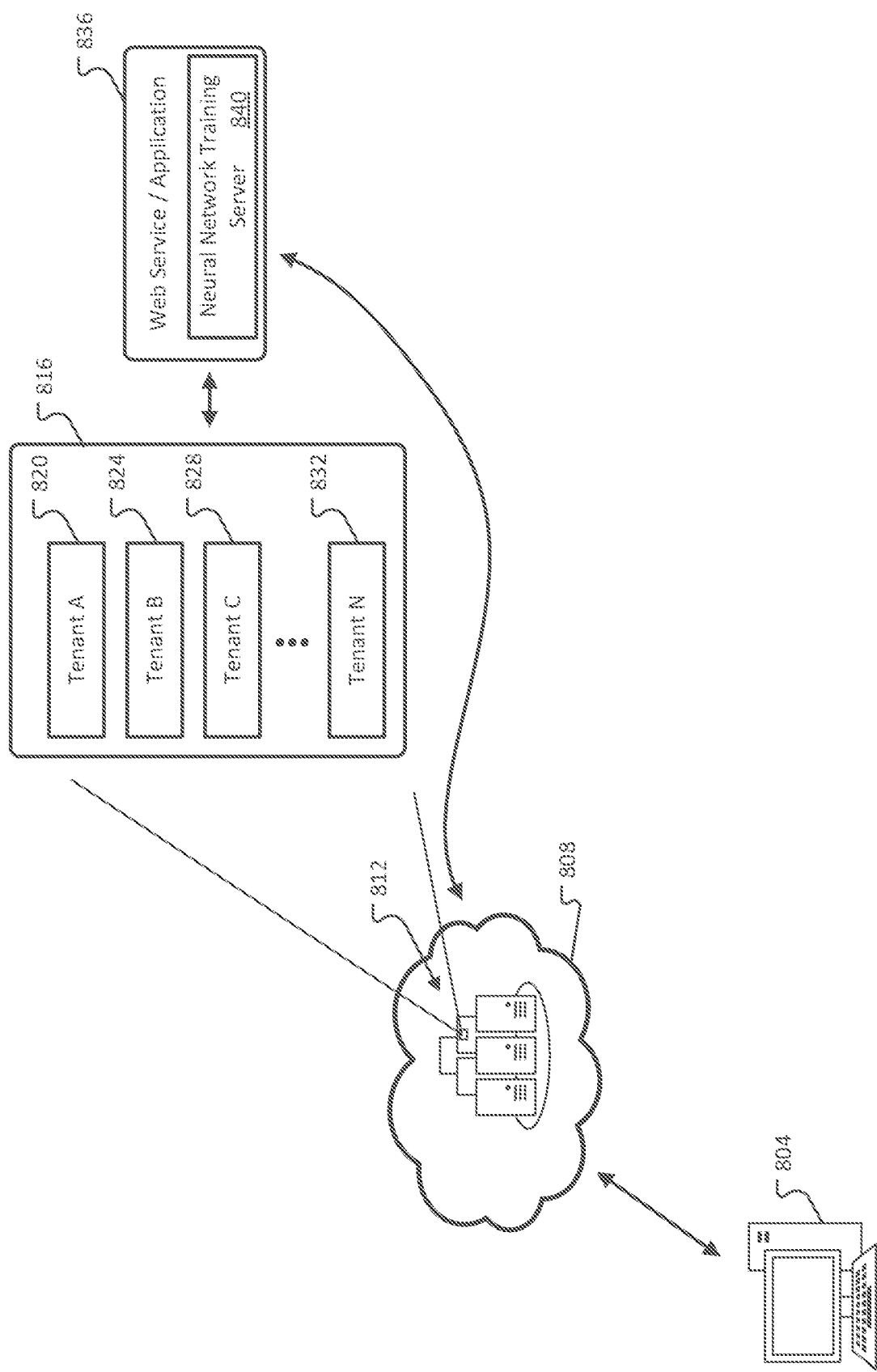
FIG. 8 provides an example system illustrating an example deployment of a hyperparameter tuning service and/or a neural network training service in accordance with examples of the present disclosure.

FIG. 8 provides an example system illustrating an example deployment of a hyperparameter tuning service and/or a neural network training service in accordance with examples of the present disclosure. More specifically, the system 800 may include a client device 804 which may be a computing device or other device in communication with a cloud services provider 812. The cloud services provider 812 may be accessible via a network 808 configured to provide a means of communication between the client device 804 and the cloud services provider 812. The cloud services provider 812 may include one or more data servers. A non-limiting example configuration of a cloud services provider 812 includes a multitenant computing platform 816 configured to include multiple tenant areas 820, 824, 828, through 832. The multiple tenant environments may divide the multitenant computing platform 816 into divisions, areas, or containers such that a user having specific access or operational rights to a certain tenant area, such as an area associated with tenant C 828, is prohibited from accessing another tenant area, such as tenant area A. Because the tenants 820-832 share a same multitenant computing platform 816, resources provided by the cloud services provider 812 may be utilized in a more efficient manner.

The client device 804 may make a request to the cloud services provider 812 for tuned hyperparameters. In one example, the client device 804 may make a request to the cloud services provider 812 for a trained neural network model, where the trained neural network model is a large neural network model. The cloud services provider 812 may route the request to a specific tenant, such as tenant 828 to fulfill the request. In some examples, the client device 804 may be interacting direction with a tenant, such as tenant A 820. Accordingly, the request may be fulfilled by a web service or application 836 that exposes or otherwise makes available the tuned hyperparameters via a neural network training server 840. In some examples, the neural network training server 840 may be the same as the hyperparameter tuning server 304 and/or the neural network training server 404. Accordingly, a client device 804 may provide a neural network with the request, a dataset with the request, or both the neural network model and the dataset with the request. Accordingly, the neural network training server 840 may generate the tuned hyperparameters as previously discussed and provide the tuned hyperparameters back to the requesting client device 804. In some examples, the neural network training server 840 may make a link to the tuned hyperparameters and/or to a trained neural network available in order to provide the trained neural network and/or the tuned hyperparameters to the client device 804. In some examples, the neural network training server 840 send the tuned hyperparameters and/or to a trained neural network directly to the client device 804. In some examples, the client device 804 may directly contact the web service and/or application 836 thereby bypassing the multitenant computing platform 816.

Figure 9:
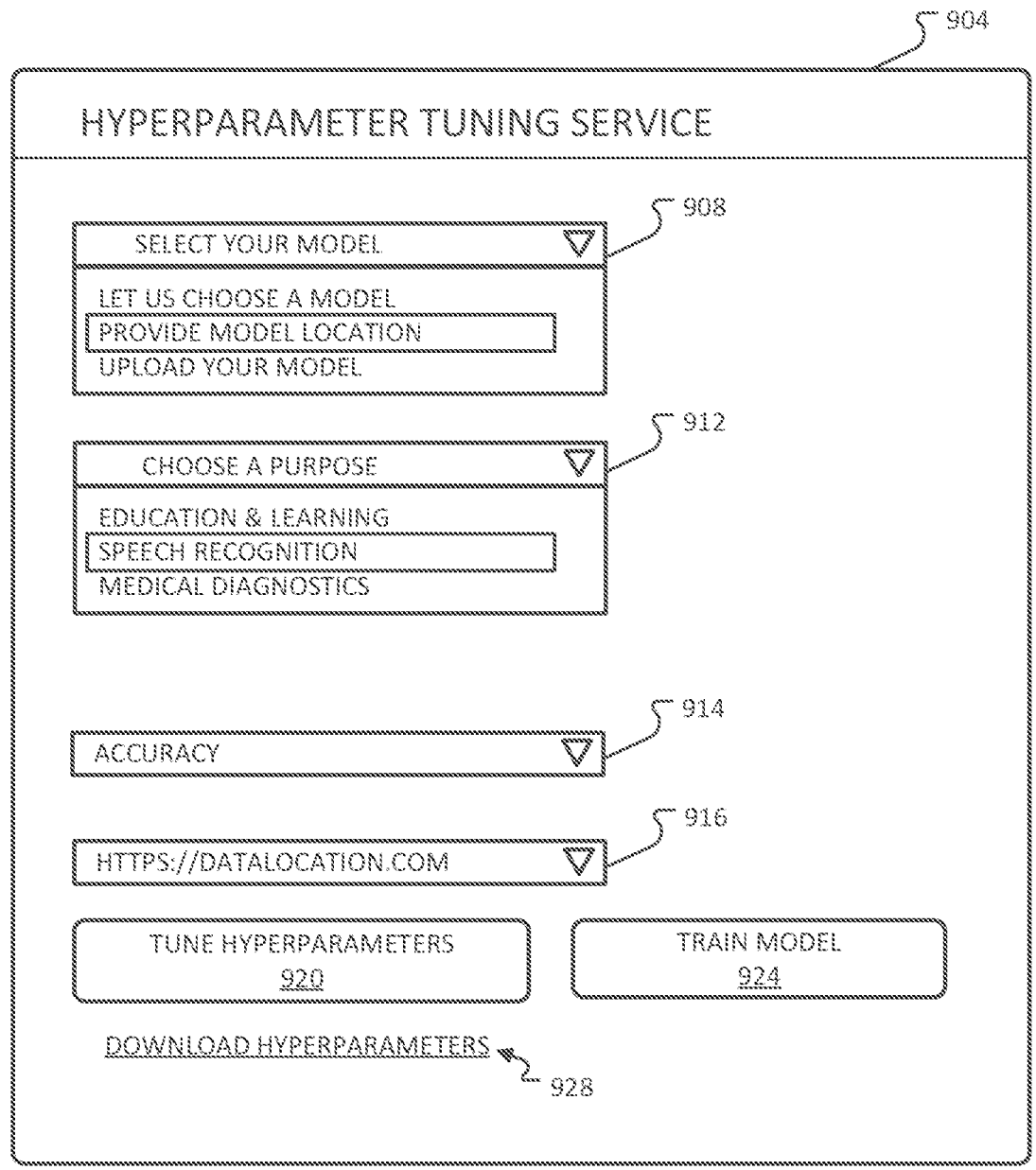
FIG. 9 provides an example user interface 904 for requesting tuned hyperparameters and/or trained neural networks in accordance with examples of the present disclosure.

FIG. 9 provides an example user interface 904 for requesting tuned hyperparameters and/or trained neural networks in accordance with examples of the present disclosure. The user interface 904 may be executed on or otherwise made available by a web service and/or application 836 for example. The user interface 904 may allow a user provide a selection of a neural network model to the web service and/or application 836 via the selection interface 908. The selection interface 908 may allow a user to provide a model location, such as an address 916 to the web service and/or application 836 for example. In at least one example, a user may provide or otherwise specify a desired accuracy for when the large neural network model is scaled to a smaller neural network model and subsequently tuned. An accuracy indication 914 may be specified at the user interface. For example, the accuracy indication may represent a deviation from the accuracy of a tuned large neural network model, such as 0.05%. In some examples, the accuracy indication 914 may indicate that an accuracy of the smaller neural network model is at least 98% of the large neural network model. In at least one example, a user may allow a hyperparameter tuning server and/or neural network model training server to choose a model, based on a dataset for example, or directly upload a model. In some examples, where a trained neural network is to be provided to a requesting user, the user interface 904 may allow a user to specify a purpose of the model. For example, the purpose may correspond to an education & learning purpose, a speech recognition purpose, and/or a medical diagnostics purpose. By selecting a purpose, a dataset specifically curated to the purpose may be used to train a neural network model. In some examples, the selection of a purpose may also allow the web service and/or application 836 to select or otherwise choose a neural network specific to the purpose.

The user interface 904 may initiate the hyperparameter training process upon selection of the button 920; alternatively, or in addition, the user interface 904 may initiate a model training process upon selection of the button 924. In some examples, the hyperparameters and/or the trained neural network may be downloaded to a user's computer using the link 928.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, described herein.

Figure 10:
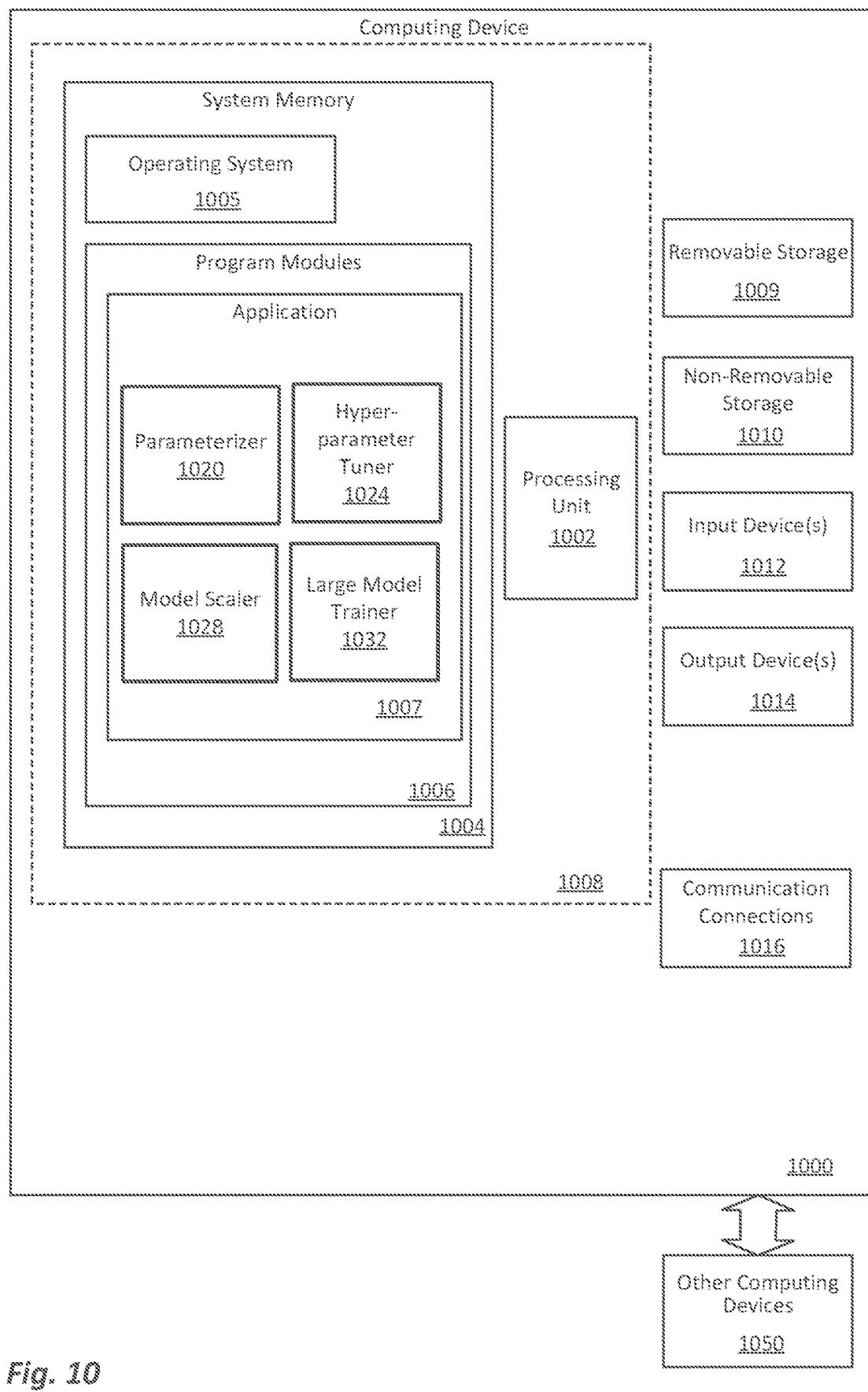
FIG. 10 depicts block diagram illustrating physical components (e.g., hardware) of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software applications 1007, such as but not limited to a parameterizer 1020, a model scaler 1028, a hyperparameter tuner 1024, and a large model trainer 1032. The parameterizer 1020 may be the same as or similar to the parameterizer 328 and/or parameterizer 428; the model scaler 1028 may be the same as or similar to the model scaler 332 and/or model scaler 432; the hyperparameter tuner 1024 may be the same as or similar to the hyperparameter tuner 336 and/or hyperparameter tuner 436; and the large model trainer 1032 may be the same as or similar to the large model trainer 434 as described with respect to, but not limited to, at least FIGS. 1-9 of the present disclosure. The operating system 1005, for example, may be suitable for controlling the operation of the computing device 1000.

Furthermore, examples of the disclosure may be practiced in conjunction with a graphics library, other operating systems, or any other application program and is not limited to any application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, several program modules and data files may be stored in the system memory 1004. While executing on the at least one processing unit 1002, the program modules 1006 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 1000 may also have one or more input device(s) 1012 such as a keyboard, a mouse, a pen, a sound or voice input device, a touch or swipe input device, etc. The output device(s) 1014A such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
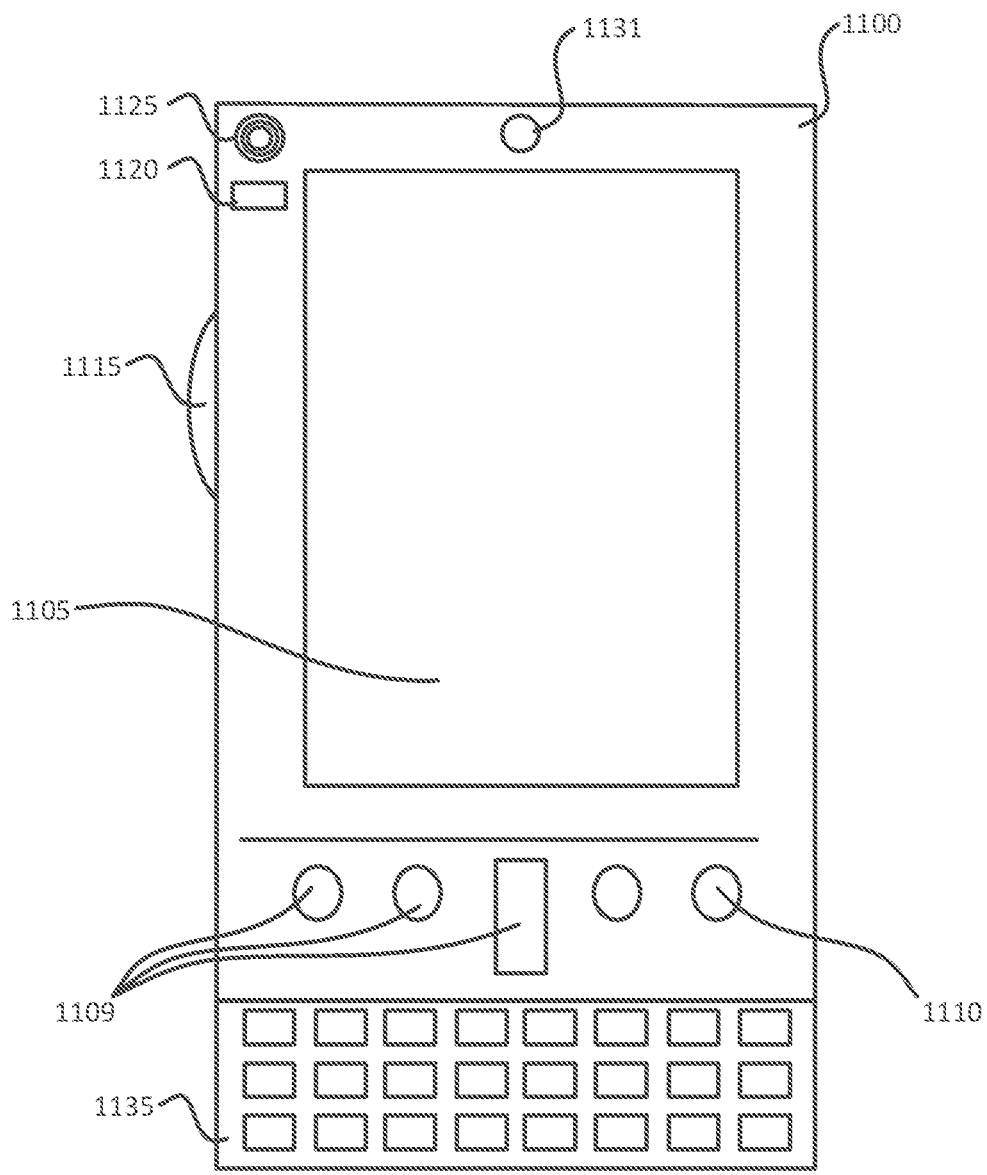
FIG. 11A illustrates a first example of a computing device with which aspects of the disclosure may be practiced.
Figure 11B:
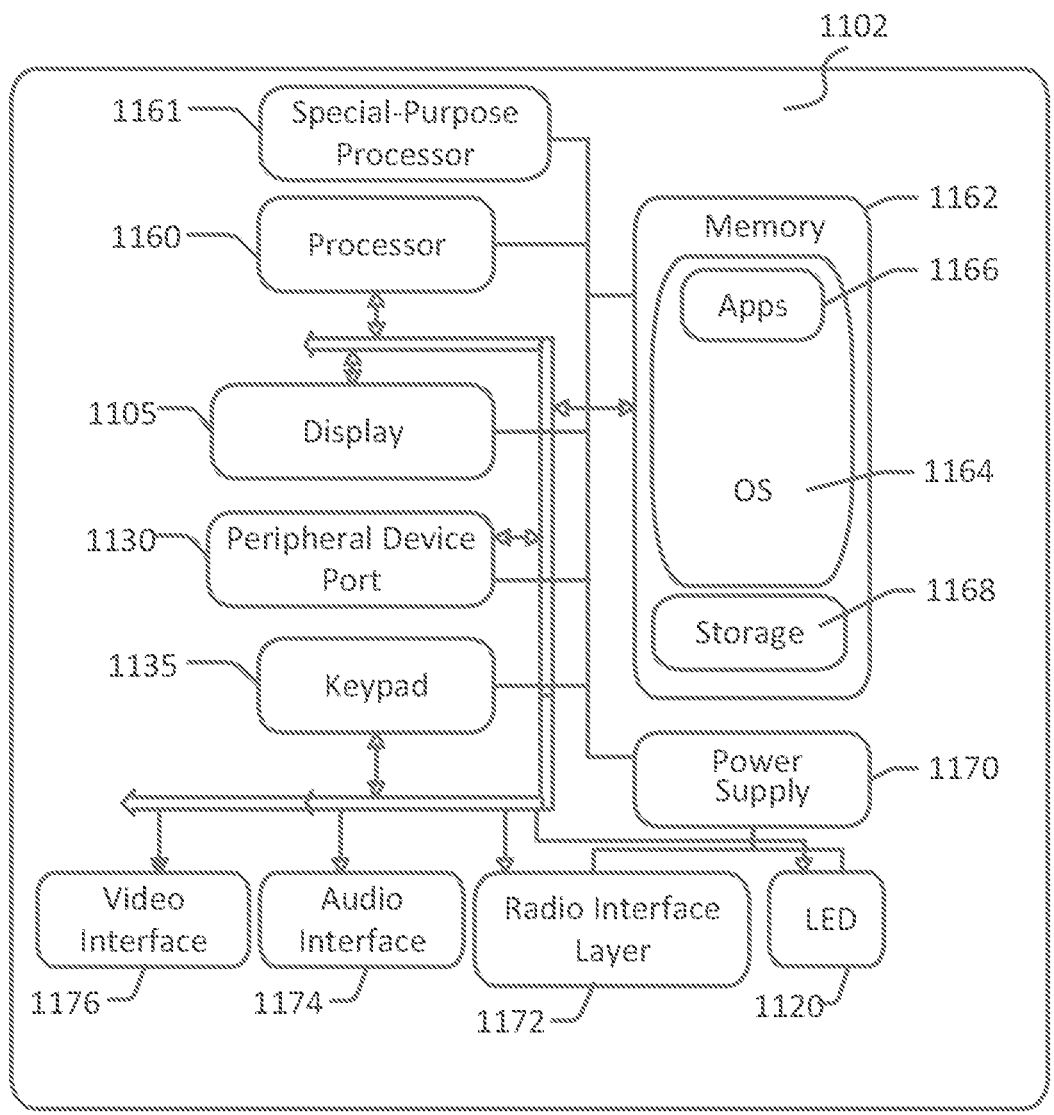
FIG. 11B illustrates a second example of a computing device with which aspects of the disclosure may be practiced.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1131 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a high-definition multimedia interface (HDMI) port) for sending signals to or receiving signals from an external source.

FIG. 11B is a block diagram illustrating the architecture of one aspect of computing device, a server, or a mobile computing device. That is, the mobile computing device 1100 can incorporate a system (1102) (e.g., an architecture) to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and/or one or more components supported by the systems described herein. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein.

The system 1102 has a power supply 1170, which may be implemented as one or more batteries. The power supply 1170 might further include an external power source, such as an alternating current (AC) adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1468.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
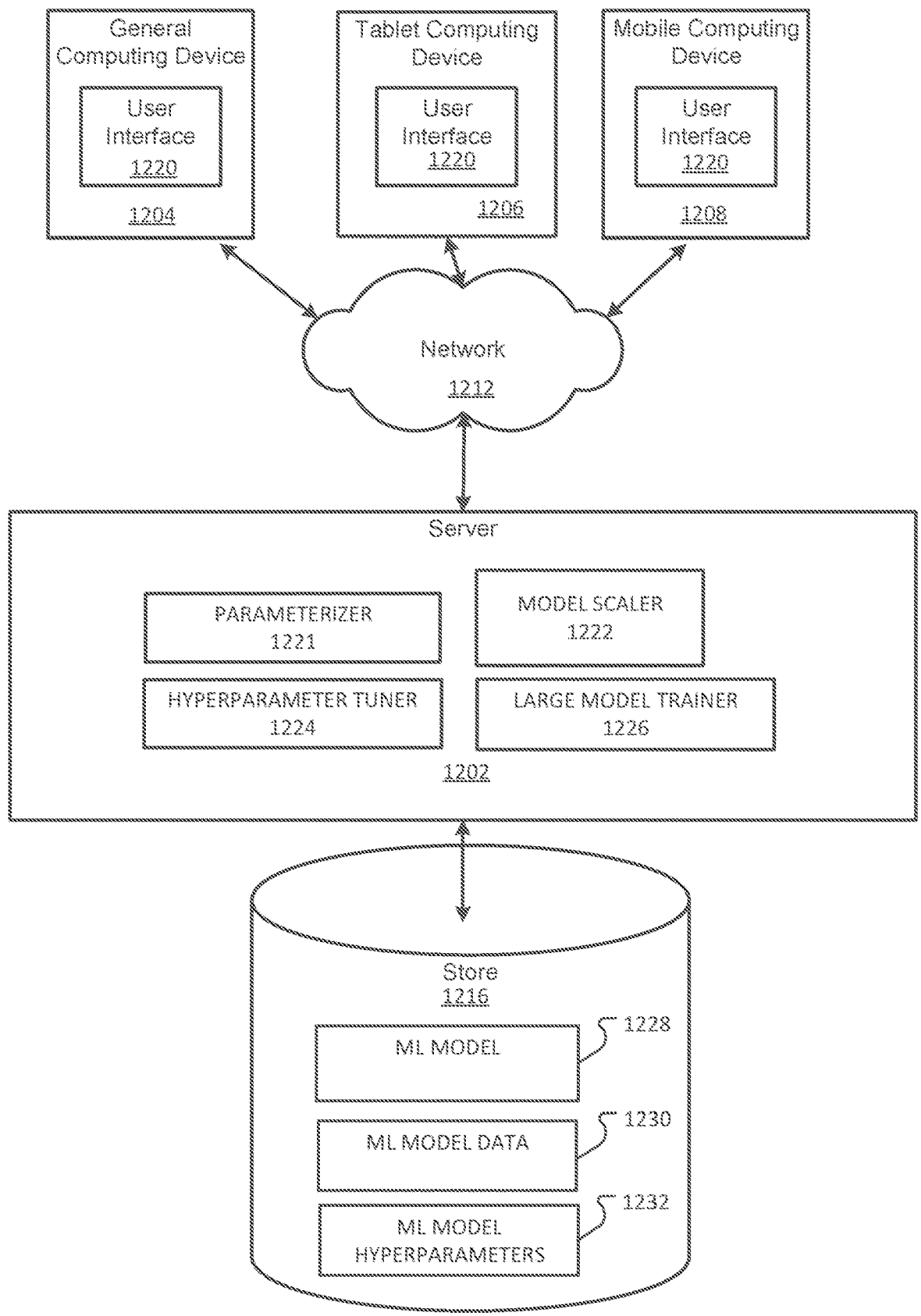
FIG. 12 illustrates at least one aspect of an architecture of a system for processing data in accordance with examples of the present disclosure.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types.

In some aspects, one or more of a parameterizer 1221, a model scaler 1222, a hyperparameter tuner 1224, and a large model trainer 1226 may be employed by server device 1202. The parameterizer 1221 may be the same as or similar to the parameterizer 1020, 328 and/or parameterizer 428; the model scaler 1222 may be the same as or similar to the model scaler 1028, 332 and/or model scaler 432; the hyperparameter tuner 1224 may be the same as or similar to the hyperparameter tuner 1024, 336 and/or hyperparameter tuner 436; and the large model trainer 1226 may be the same as or similar to the large model trainer 1036, 434 as described with respect to, but not limited to, at least FIGS. 1-11 of the present disclosure.

The server device 1202 may provide data to and from a client computing device such as a personal computer 1204, a tablet computing device 1206 and/or a mobile computing device 1208 (e.g., a smart phone) through a network 1212. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system. The content store may include the machine learning model repository 1228, the machine learning model data repository 1230, and/or the machine learning model hyperparameter repository 1232.

FIG. 12 illustrates an exemplary mobile computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces 1220 and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very large scale integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for tuning one or more hyperparameters of a large neural network model, wherein the large neural network model comprising an infinitely-wide neural network model, the method comprising:
receiving the large neural network model;
parameterizing the large neural network model according to a parameterization scheme, wherein when a transformer is used in the large neural network model, the parameterization scheme comprises a dot-product attention logit scaler hyperparameter;

reducing a width of at least one layer of the large neural network model resulting in a smaller neural network model, the smaller neural network model comprising at least a reduced width of one or more layers of the infinitely-wide neural network model;

performing a hyperparameter tuning process using the smaller neural network model to identify a tuned hyperparameter, wherein a model scaling process is based on an estimated amount of computational resources, energy, and/or time is used to tune the hyperparameter, wherein the hyperparameter is tuned using a logit scaling parameter;

identifying the optimized tuple of hyperparameters based on the tuning process;

adjusting the tuning process based on the optimized tuple of hyperparameters, wherein the optimized tuple minimizes a predetermined loss function;

returning the smaller neural network based on using the adjusted tuning process; and transferring the tuned hyperparameter to the large neural network model using an identified scaling factor.

2. The method of claim 1, wherein the hyperparameter tuning process includes performing an exhaustive search to identify an optimized hyperparameter.

3. The method of claim 2, further comprising using the optimized hyperparameter in the large neural network model during a training process.

4. The method of claim 1, wherein reducing the width of the at least one layer of the large neural network model is based at least upon an amount of available computing resources.

5. The method of claim 1, wherein the parameterization includes scaling at least one layer by a function of a width of the layer.

6. A method for providing hyperparameters, the method comprising:

receiving a neural network model, wherein the neural network model comprising an infinitely-wide neural network model;

receiving, from a first requestor, a request for one or more tuned hyperparameters associated with the neural network model;

parameterizing the received neural network model, wherein when a transformer is used in the large neural network model, the parameterization scheme comprises a dot-product attention logit scaler hyperparameter;

scaling the received neural network model to a smaller size neural network model, the smaller size neural network model comprising at least a reduced width of one or more layers of the infinitely-wide neural network model, wherein a model scaling process is based on an estimated amount of computational resources, energy, and/or time is used to tune the hyperparameter, wherein the hyperparameter is tuned using a logit scaling parameter;

tuning one or more hyperparameters associated with the smaller size neural network model and transferring the tuned one or more hyperparameters to the neural network model using an identified scaling factor;

identifying the optimized tuple of hyperparameters based on the tuning process;

adjusting the tuning process based on the optimized tuple of hyperparameters, wherein the optimized tuple minimizes a predetermined loss function;

returning the smaller neural network based on using the adjusted tuning process;

providing the one or more tuned hyperparameters to the requestor.

7. The method of claim 6, wherein the received neural network model is scaled based on an availability of resources for tuning the one or more hyperparameters.

8. The method of claim 6, further comprising training the neural network model with the one or more tuned hyperparameters.

9. The method of claim 8, further comprising predicting an output based on an input utilizing the trained neural network model.

10. The method of claim 6, further comprising transferring the one or more tuned hyperparameters from the smaller size neural network model to the neural network model.

11. The method of claim 6, wherein the parameterization includes scaling at least one layer of the neural network model by a function of a width of the layer.

12. The method of claim 6, wherein the one or more tuned hyperparameters is associated with a neural network learning rate, the neural network learning rate including a tuned hyperparameter constant and an adjustment portion that is a function of a width of a last layer of the neural network model.

13. The method of claim 6, further comprising:

tuning the one or more hyperparameters associated with the smaller size neural network model by completing a plurality of tuning passes;

transferring the one or more tuned hyperparameters associated with the smaller neural network to the neural network model; and performing a single neural network model learning pass.

14. The method of claim 6, further comprising providing a trained neural network model to the requestor.

15. The method of claim 6, further comprising:

receiving an accuracy indication from the requestor, the accuracy indication being related to a size of the smaller neural network model.

16. A data center server configured to provide one or more tuned hyperparameters based on a received input, the data center server including:

a processor; and memory, the memory including instructions, which when executed by the processor, causes the processor to:

receive a neural network model, wherein the neural network model comprising an infinitely-wide neural network model, wherein the infinitely-wide neural network model is parameterized using a transformer and a parameterization scheme comprising a dot-product attention logit scaler hyperparameter;

receive, from a first requestor, a request for a set of non-structural hyperparameters comprising at least one hyperparameter associated with the neural network model;

scale the received neural network model to a smaller size neural network model, the smaller neural network model comprising at least a reduced width of one or more layers of the infinitely-wide neural network model, wherein a model scaling process is based on an estimated amount of computational resources, energy, and/or time is used to tune the hyperparameter, wherein the hyperparameter is tuned using a logit scaling parameter;

tune one or more hyperparameters associated with the smaller size neural network model and transfer the tuned one or more hyperparameters to the neural network model using an identified scaling factor;

identifying the optimized tuple of hyperparameters based on the tuning process;

adjusting the tuning process based on the optimized tuple of hyperparameters, wherein the optimized tuple minimizes a predetermined loss function;

returning the smaller neural network based on using the adjusted tuning process; and provide the one or more tuned hyperparameters to the requestor as the set of non-structural hyperparameters, wherein the one or more tuned hyperparameters may be used to train the received neural network model.

17. The data center server of claim 16, further comprising parameterizing the received neural network model.

18. The data center server of claim 17, wherein the parameterization includes scaling a plurality of layers of the received neural network model by a function of a width of the layer.

19. The data center server of claim 16, further comprising providing a trained neural network model to the requestor.

20. The data center server of claim 16, wherein the set of non-structural hyperparameters includes at least one of a learning rate hyperparameter, a hyperparameter associated with a last layer of the neural network, or a node initialization hyperparameter.

\* \* \* \* \*